United States Patent
Baldemair et al.

(10) Patent No.: US 12,156,217 B2
(45) Date of Patent: Nov. 26, 2024

(54) OVERLAPPING MULTI-SLOT AND SINGLE-SLOT CONTROL CHANNEL RESOURCES

(71) Applicant: Telefonaktiebolaget LM Ericsson (publ), Stockholm (SE)

(72) Inventors: Robert Baldemair, Solna (SE); Sorour Falahati, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 544 days.

(21) Appl. No.: 17/280,599

(22) PCT Filed: Sep. 18, 2019

(86) PCT No.: PCT/EP2019/075006
§ 371 (c)(1),
(2) Date: Mar. 26, 2021

(87) PCT Pub. No.: WO2020/064458
PCT Pub. Date: Apr. 2, 2020

(65) Prior Publication Data
US 2021/0360614 A1  Nov. 18, 2021

Related U.S. Application Data

(60) Provisional application No. 62/738,827, filed on Sep. 28, 2018.

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1819* (2013.01); *H04L 1/1896* (2013.01);
(Continued)

(58) Field of Classification Search
CPC ... H04L 1/1819; H04L 1/1896; H04L 1/1854; H04W 72/21; H04W 72/0446; H04W 72/1263; H04W 72/53; H04W 72/54
(Continued)

(56) References Cited

U.S. PATENT DOCUMENTS

2013/0208665 A1  8/2013  Baldemair et al.
2016/0100395 A1  4/2016  Xu et al.
(Continued)

FOREIGN PATENT DOCUMENTS

CN    107005273 A    8/2017
JP    2006333502 A   12/2006
(Continued)

OTHER PUBLICATIONS

Huawei, et al., "Outcome offline discussion on PUCCH structure in long-duration", 3GPP TSG RAN WG1 Meeting #93, R1-1807854, Busan, Korea, May 21-May 25, 2018, 1-14.
(Continued)

*Primary Examiner* — Rownak Islam
(74) *Attorney, Agent, or Firm* — Murphy, Bilak & Homiller, PLLC

(57) ABSTRACT

A wireless device (12) determines that an uplink control channel resource (20B) for a multi-slot uplink control channel transmission (16B) overlaps in time with an uplink control channel resource (20A) for a single-slot uplink control channel transmission (16A) in a slot (18X). The wireless device (12) decides, for the slot (18X), either to drop whichever of the multi-slot uplink control channel transmission (16B) and the single-slot uplink control channel transmission (16A) carries uplink control information of a lower priority or to drop a certain one of the multi-slot uplink control channel transmission (16B) and the single-slot uplink control channel transmission (16A), depending
(Continued)

on whether the multi-slot uplink control channel transmission (16B) and the single-slot uplink control channel transmission (16A) carry uplink control information of different priorities or the same priority, respectively. The wireless device (12) drops the single-slot uplink control channel transmission (16A) or the multi-slot uplink control channel transmission (16B) in the slot (18X), according to that decision.

20 Claims, 20 Drawing Sheets

(51) Int. Cl.
*H04L 1/1867* (2023.01)
*H04W 72/0446* (2023.01)
*H04W 72/1263* (2023.01)
*H04W 72/53* (2023.01)
*H04W 72/54* (2023.01)

(52) U.S. Cl.
CPC ... *H04W 72/0446* (2013.01); *H04W 72/1263* (2013.01); *H04W 72/53* (2023.01); *H04W 72/54* (2023.01)

(58) Field of Classification Search
USPC .......................................... 370/329
See application file for complete search history.

(56) References Cited

U.S. PATENT DOCUMENTS

| 2018/0019843 | A1 | 1/2018 | Papasakellariou | |
|---|---|---|---|---|
| 2018/0294938 | A1 | 10/2018 | Munier et al. | |
| 2019/0306922 | A1* | 10/2019 | Xiong | H04W 72/21 |
| 2020/0068558 | A1* | 2/2020 | Yang | H04L 5/0064 |
| 2020/0404692 | A1* | 12/2020 | Yin | H04L 1/1887 |
| 2021/0120559 | A1* | 4/2021 | Li | H04L 5/0053 |

FOREIGN PATENT DOCUMENTS

| WO | 2015139862 A1 | 9/2015 |
|---|---|---|
| WO | 2018173482 A1 | 9/2018 |

OTHER PUBLICATIONS

Mediatek Inc., "Remaining issues of Pucch", 3GPP TSG RAN WG1 Meeting #94, R1-1808260, Gothenburg, Sweden, Aug. 20-24, 2018, 1-11.

Vivo, "Remaining issues on PUCCH", 3GPP TSG RAN WG1 Meeting #94, R1-1808225, Gothenburg, Sweden, August 21-Aug. 25, 2018, 1-5.

CATT, "Corrections to UCI feedback procedures", 3GPP TSG RAN WG1 Meeting #94, R1-1809713, Gothenburg, Sweden, Aug. 20-24, 2018, 1-20.

* cited by examiner

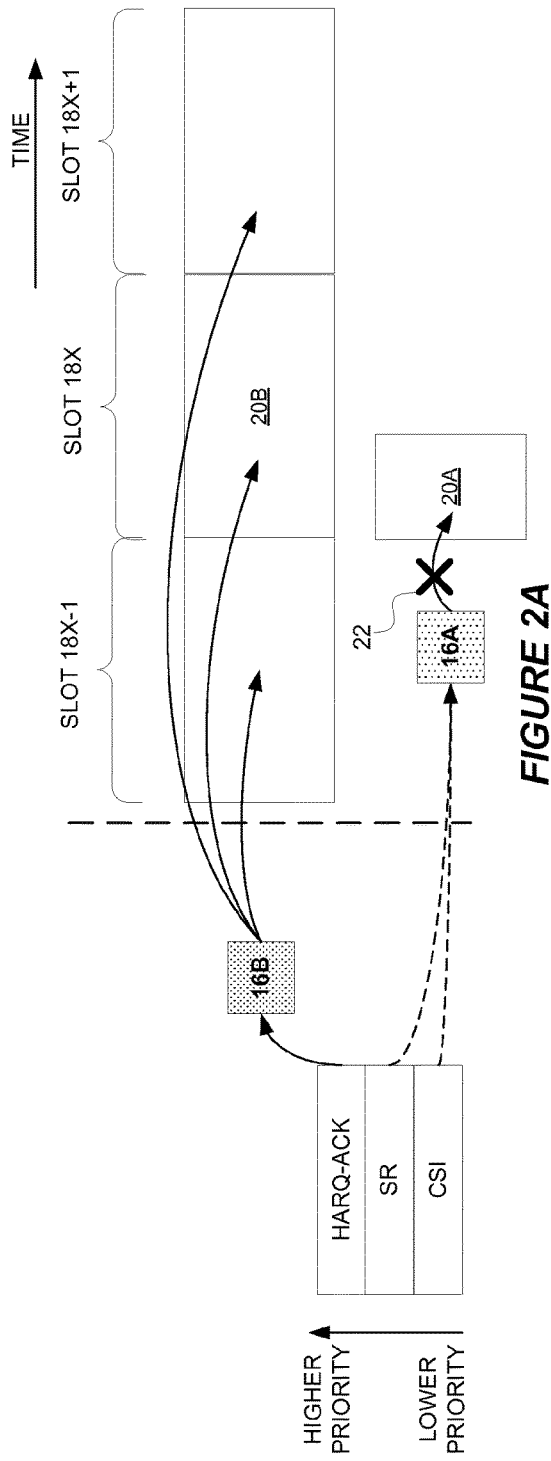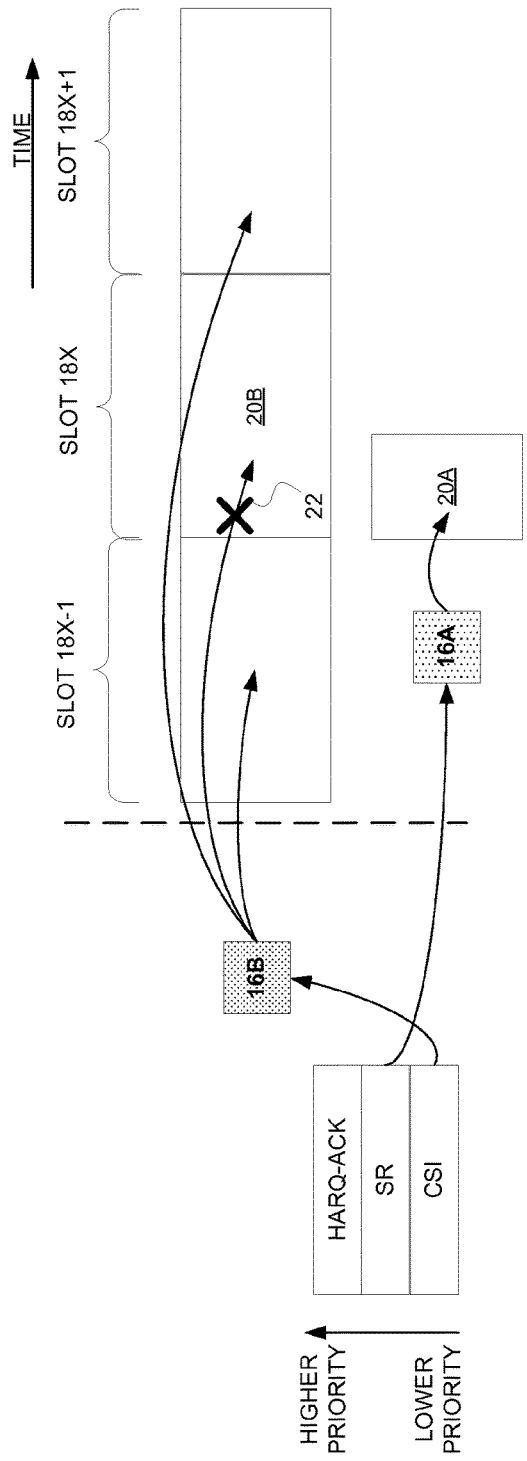
FIGURE 2A
FIGURE 2B

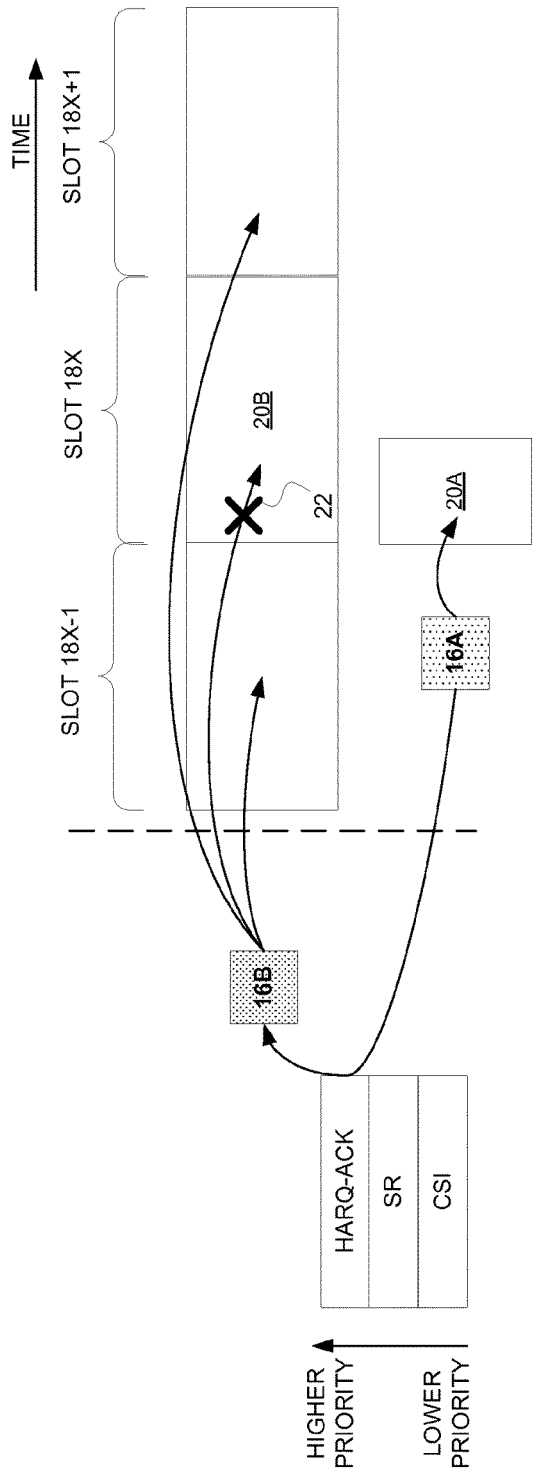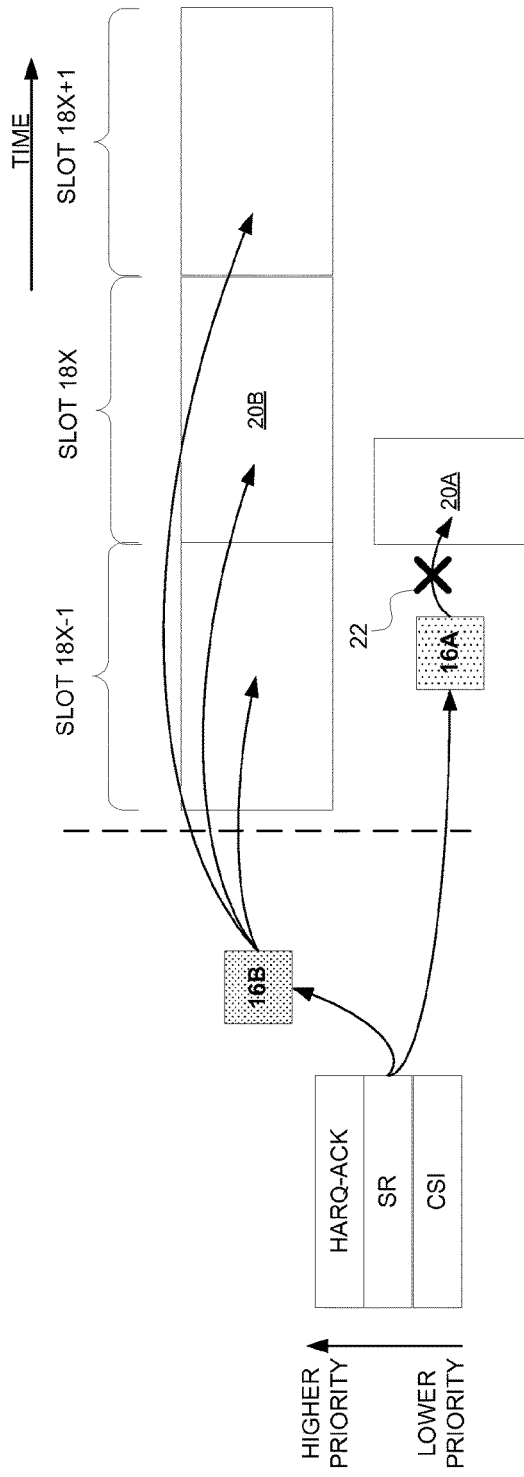

OVERLAPPING MULTI-SLOT AND SINGLE-SLOT CONTROL CHANNEL RESOURCES

TECHNICAL FIELD

The present application relates generally to a wireless communication system, and relates more particularly to handling an overlap in the resources to be used for a multi-slot control channel transmission and a single-slot control channel transmission.

BACKGROUND

A wireless device in a wireless communication system transmits so-called uplink control information (UCI) to a base station. The UCI may include for instance hybrid automatic repeat request (HARQ) feedback, scheduling requests, and/or channel state information (CSI). A radio resource for transmitting the UCI may be confined to just a single time slot, i.e., a single-slot resource. Or, in less favorable channel conditions, the UCI may be repeated in time on a radio resource that spans multiple time slots, i.e., a multi-slot resource.

Under some circumstances, such as those attributable to multiple HARQ processes running in parallel or a control channel resource being configured for periodic CSI transmission, a wireless device may be scheduled to transmit UCI on both a single-slot resource and a multi-slot resource. If those resources overlap so that they share a common time slot, challenges exist in how to handle or resolve that overlap in a way that mitigates system performance degradation.

SUMMARY

Some embodiments herein handle or resolve a scenario where a single-slot uplink control channel transmission and a multi-slot uplink control channel transmission overlap in a slot. Some embodiments, for example, employ dropping rules that dictate which of the transmissions the wireless device is to drop. The dropping rules may enable the wireless device to drop whichever of the transmissions whose dropping would impact system performance the least. For instance, if the transmissions carry uplink control information with different priorities, the rules may dictate that the wireless device drop whichever of the transmissions carries uplink control information with the lesser priority. But if the transmissions carry uplink control information with the same priority, the rules may dictate that the wireless device drop a certain one the transmissions, e.g., always drop the single-slot transmission. In these and other embodiments, then, the wireless device according to the dropping rules may advantageously avoid dropping uplink control information that is prioritized and/or that would result in more performance degradation.

More particularly, embodiments herein include a method performed by a wireless device configured for use in a wireless communication system. The method comprises determining that an uplink control channel resource for a multi-slot uplink control channel transmission overlaps in time with an uplink control channel resource for a single-slot uplink control channel transmission in a slot. The method also includes deciding, for the slot, either to drop whichever of the multi-slot uplink control channel transmission and the single-slot uplink control channel transmission carries uplink control information of a lower priority or to drop a certain one of the multi-slot uplink control channel transmission and the single-slot uplink control channel transmission, depending on whether the multi-slot uplink control channel transmission and the single-slot uplink control channel transmission carry uplink control information of different priorities or the same priority, respectively. The method may also include dropping the single-slot uplink control channel transmission or the multi-slot uplink control channel transmission in the slot, according to said deciding.

In some embodiments, the certain one of the multi-slot uplink control channel transmission and the single-slot uplink control channel transmission is the single-slot uplink control channel transmission. In other embodiments, the certain one of the multi-slot uplink control channel transmission and the single-slot uplink control channel transmission is the multi-slot uplink control channel transmission.

In some embodiments, the uplink control channel resource for the multi-slot uplink control channel transmission comprises a physical uplink control channel, PUCCH, resource for a multi-slot PUCCH transmission, the multi-slot uplink control channel transmission is the multi-slot PUCCH transmission, the uplink control channel resource for the single-slot uplink control channel transmission comprises a PUCCH resource for a single-slot PUCCH transmission, and the single-slot uplink control channel transmission is the single-slot PUCCH transmission.

In some embodiments, different types of uplink control information include hybrid automatic repeat request, HARQ, acknowledgement information, a scheduling request, SR, and channel state information, CSI. In this case, HARQ acknowledgment information has a higher priority than an SR, and an SR has a higher priority than CSI.

In some embodiments, said deciding comprises deciding, for the slot, either to drop whichever of the multi-slot uplink control channel transmission and the single-slot uplink control channel transmission carries uplink control information of a lower priority or to drop the single-slot uplink control channel transmission, depending on whether the multi-slot uplink control channel transmission and the single-slot uplink control channel transmission carry uplink control information of different priorities or the same priority, respectively.

In some embodiments, the wireless communication system is a 5G system or a New Radio, NR, system.

Embodiments herein also include a method performed by a base station configured for use in a wireless communication system. The method comprises determining that an uplink control channel resource for a multi-slot uplink control channel transmission overlaps in time with an uplink control channel resource for a single-slot uplink control channel transmission in a slot. The method further includes deciding, for the slot, either to receive whichever of the multi-slot uplink control channel transmission and the single-slot uplink control channel transmission carries uplink control information of a higher priority or to receive a certain one of the multi-slot uplink control channel transmission and the single-slot uplink control channel transmission, depending on whether the multi-slot uplink control channel transmission and the single-slot uplink control channel transmission carry uplink control information of different priorities or the same priority, respectively. The method may also comprise receiving the single-slot uplink control channel transmission or the multi-slot uplink control channel transmission in the slot, according to said deciding.

In some embodiments, the certain one of the multi-slot uplink control channel transmission and the single-slot uplink control channel transmission is the single-slot uplink control channel transmission. In other embodiments, the certain one of the multi-slot uplink control channel transmission and the single-slot uplink control channel transmission is the multi-slot uplink control channel transmission.

In some embodiments, the uplink control channel resource for the multi-slot uplink control channel transmission comprises a physical uplink control channel, PUCCH, resource for a multi-slot PUCCH transmission, the multi-slot uplink control channel transmission is the multi-slot PUCCH transmission, the uplink control channel resource for the single-slot uplink control channel transmission comprises a PUCCH resource for a single-slot PUCCH transmission, and the single-slot uplink control channel transmission is the single-slot PUCCH transmission.

In some embodiments, different types of uplink control information include hybrid automatic repeat request, HARQ, acknowledgement information, a scheduling request, SR, and channel state information, CSI. In this case, HARQ acknowledgment information has a higher priority than an SR, and an SR has a higher priority than CSI.

In some embodiments, said deciding comprises deciding, for the slot, either to receive whichever of the multi-slot uplink control channel transmission and the single-slot uplink control channel transmission carries uplink control information of a higher priority or to receive the multi-slot uplink control channel transmission, depending on whether the multi-slot uplink control channel transmission and the single-slot uplink control channel transmission carry uplink control information of different priorities or the same priority, respectively.

In some embodiments, the wireless communication system is a 5G system or a New Radio, NR, system.

Embodiments herein further include corresponding apparatus, computer programs, and carriers. For example, embodiments herein include a wireless device configured for use in a wireless communication system. The wireless device is configured (e.g., via communication circuitry and processing circuitry) to determine that an uplink control channel resource for a multi-slot uplink control channel transmission overlaps in time with an uplink control channel resource for a single-slot uplink control channel transmission in a slot. The wireless device is also configured to decide, for the slot, either to drop whichever of the multi-slot uplink control channel transmission and the single-slot uplink control channel transmission carries uplink control information of a lower priority or to drop a certain one of the multi-slot uplink control channel transmission and the single-slot uplink control channel transmission, depending on whether the multi-slot uplink control channel transmission and the single-slot uplink control channel transmission carry uplink control information of different priorities or the same priority, respectively. The wireless device may also be configured to drop the single-slot uplink control channel transmission or the multi-slot uplink control channel transmission in the slot, according to said deciding.

Embodiments herein further include a base station configured for use in a wireless communication system. The base station is configured (e.g., via communication circuitry and processing circuitry) to determine that an uplink control channel resource for a multi-slot uplink control channel transmission overlaps in time with an uplink control channel resource for a single-slot uplink control channel transmission in a slot. The base station is further configured to decide, for the slot, either to receive whichever of the multi-slot uplink control channel transmission and the single-slot uplink control channel transmission carries uplink control information of a higher priority or to receive a certain one of the multi-slot uplink control channel transmission and the single-slot uplink control channel transmission, depending on whether the multi-slot uplink control channel transmission and the single-slot uplink control channel transmission carry uplink control information of different priorities or the same priority, respectively. The base station may also be configured to receive the single-slot uplink control channel transmission or the multi-slot uplink control channel transmission in the slot, according to said deciding.

BRIEF DESCRIPTION OF THE DRAWINGS

FIG. 2A is a block diagram of dropping rules according to some embodiments.

FIG. 2B is a block diagram of dropping rules according to other embodiments.

FIG. 3A is a block diagram of dropping rules according to still other embodiments.

FIG. 3B is a block diagram of dropping rules according to yet other embodiments.

DETAILED DESCRIPTION

Figure 1:
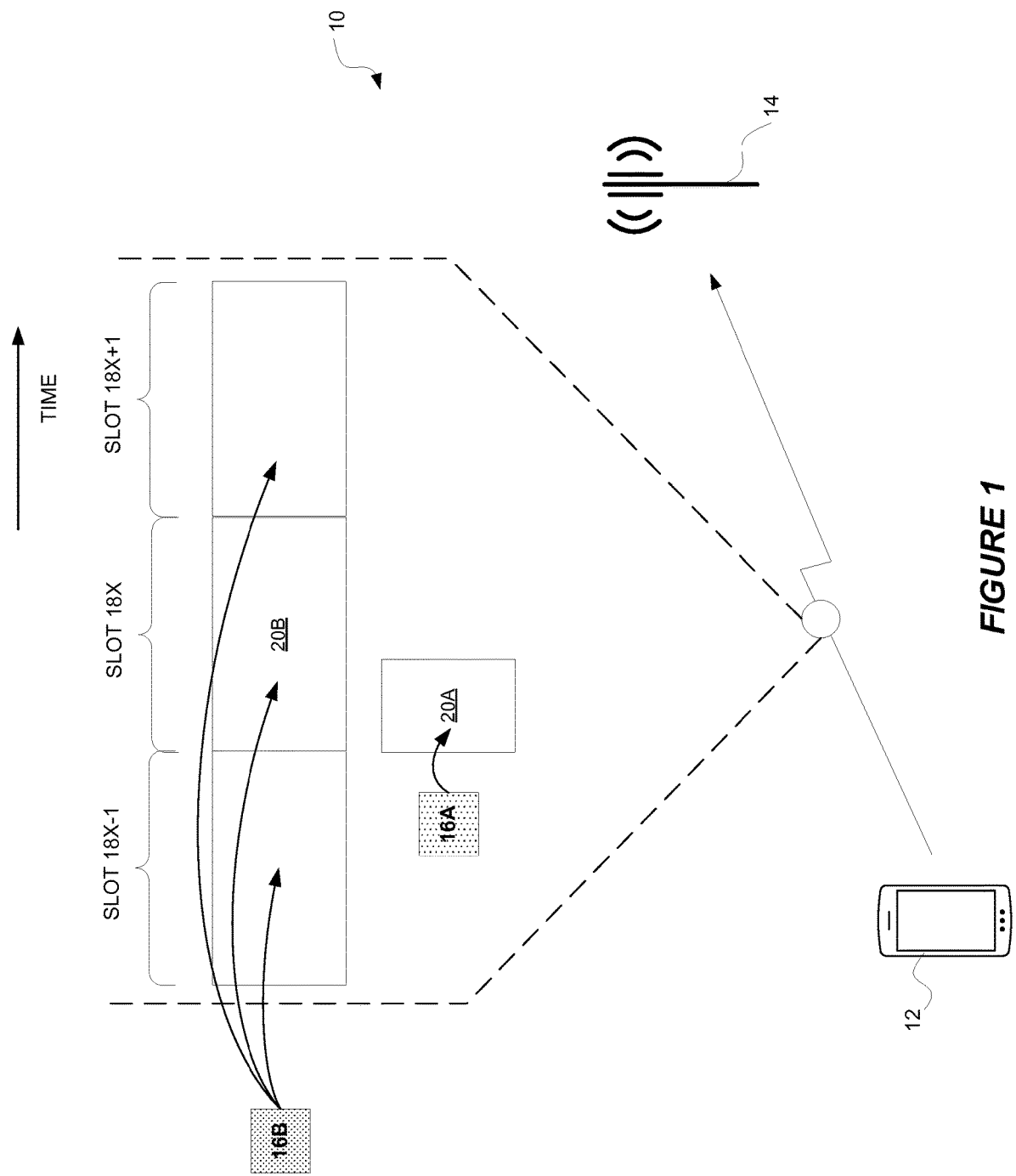
FIG. 1 is a block diagram of a wireless communication system according to some embodiments.

FIG. 1 shows a wireless communication system 10 (e.g., a 5G or New Radio system) according to some embodiments. The system 10 includes a wireless device 12 (e.g., a user equipment) and a base station 14 (or more generally, a radio network node). The wireless device 12 is configured to transmit uplink control information (UCI) to the base station 14. The UCI may for instance include hybrid automatic repeat request (HARQ) acknowledgement (ACK) information, such as an ACK or NACK to positively or negatively acknowledge a downlink transmission that the wireless device 12 received from the base station 14. Alternatively or additionally, the UCI may include a scheduling request (SR) for requesting that the base station 14 schedule radio resources on which the wireless device 12 may transmit uplink data to the base station. The UCI may alternatively or additionally include channel state information (CSI) that characterizes the state of an uplink or downlink channel. Regardless of the particular type of UCI, the wireless device 12 is configured to transmit that UCI to the base station 14 over an uplink control channel, e.g., a Physical Uplink Control Channel (PUCCH).

More particularly in this regard, the wireless device 12 as shown has a single-slot uplink control channel transmission 16A (e.g., a single-slot PUCCH transmission) to transmit in a slot 18X, e.g., according to a timing requirement, such as a HARQ-ACK timing requirement, that requires the transmission 16A to be transmitted in such a slot 18X. The single-slot uplink control channel transmission 16A may be single-slot in nature as shown as it is to be performed over a single slot in time, e.g., slot 18X. The wireless device 12 is to transmit this single-slot uplink control channel transmission 16A in an uplink control channel resource 20A (e.g., a PUCCH resource). The uplink control channel resource 20A may be defined for instance in the time domain (e.g., in terms of a starting symbol, a number of symbols, etc.), in the frequency domain (e.g., in terms of a starting physical resource block, a number of physical resource blocks, intra-slot frequency hopping, etc.), and/or the code domain (e.g., in terms of an orthogonal cover code).

However, the wireless device 12 as shown also has a multi-slot uplink control channel transmission 16B (e.g., a multi-slot PUCCH transmission) to transmit in the same slot 18X, e.g., according to a timing requirement, such as a HARQ-ACK timing requirement, that requires the transmission 16B to be transmitted in such a slot 18X. The wireless device 12 is to transmit this multi-slot uplink control channel transmission 16B in an uplink control channel resource 20B (e.g., a PUCCH resource), which as shown spans the whole slot 18X (e.g., 14 symbols). The multi-slot uplink control channel transmission 16B may be multi-slot in nature as shown as it is to be performed (e.g., by repetition) over multiple slots, e.g., slot 18X−1, slot 18X, and slot 18X+1.

As shown, though, the uplink control channel resource 20B for the multi-slot uplink control channel transmission 16B overlaps in time with the uplink control channel resource 20A for the single-slot uplink control channel transmission 16A in the slot 18X. The overlap in slot 18X may be partial in the sense that a part of the slot 18X (e.g., one or more symbols of the slot 18X) over which the uplink control channel resource 20B for the multi-slot uplink control channel transmission spans is the same as or overlaps with a part of the slot 18X over which the uplink control channel resource 20A for the single-slot uplink control channel transmission 16A spans. For example, both uplink control channel resources 20A, 20B may span one or more, but not all, symbols in the slot 18X, and the uplink control channel resources 20A, 20B span the same symbol(s) in the slot 18X. As another example, the uplink control channel resources 20A, 20B may occur on different symbols in the slot 18X, but overlap in at least one symbol. In other embodiments not shown, however, the overlap in slot 18X may be full in the sense that both the uplink control channel resource 20B for the multi-slot uplink control channel transmission 16B and the uplink control channel resource 20A for the single-slot uplink control channel transmission 16A fully span the whole slot 18X.

Regardless, according to some embodiments herein, the wireless device 12 employs certain dropping rules to account for the overlap in slot 18X, e.g., so as to reduce the impact that the overlap has on system performance. More particularly, the wireless device 12 in some embodiments decides whether to drop the single-slot uplink control channel transmission 16A in the slot 18X or to drop the multi-slot uplink control channel transmission 16B in the slot 18X. The wireless device 12 then drops (i.e., does not transmit) one of the transmissions 16A, 16B in the slot 18X according to that decision.

If the UCI carried by the single-slot uplink control channel transmission 16A has a different priority than the UCI carried by the multi-slot uplink control channel transmission 16B in the slot 18X, the wireless device 12 drops whichever one of the transmissions 16A, 16B in the slot 18X carries UCI of a lower priority. FIGS. 2A and 2B show some examples where HARQ-ACK has a higher priority than an SR, and an SR has a higher priority than CSI. As shown in FIG. 2A, the multi-slot uplink control channel transmission 16B carries HARQ-ACK whereas the single-slot uplink control channel transmission 16A carries either an SR or CSI. Because the HARQ-ACK carried by the multi-slot uplink control channel transmission 16B has a higher priority than the SR or CSI carried by the single-slot uplink control channel transmission 16A, the wireless device 12 makes a dropping decision 22 to drop the single-slot uplink control channel transmission 16A in slot 18X. Dropping CSI carried by the single-slot uplink control channel transmission 16A, for instance, may impact system performance to a lesser degree than dropping the HARQ-ACK carried by the multi-slot uplink control channel transmission 16B. Indeed, dropped HARQ-ACK would definitely require a re-transmission, whereas dropped CSI may not, especially if the base station 14 still has previously reported CSI that can acceptably used in lieu of newly reported CSI.

In another example shown in FIG. 2B, by contrast, the multi-slot uplink control channel transmission 16B carries CSI whereas the single-slot uplink control channel transmission 16A carries an SR. Because the SR carried by the single-slot uplink control channel transmission 16A has a higher priority than the CSI carried by the multi-slot uplink control channel transmission 16B, the wireless device 12 makes a dropping decision 22 to drop the multi-slot uplink control channel transmission 16B in slot 18X, e.g., by dropping the multi-slot uplink control channel transmission 16B in each symbol on which the multi-slot uplink control channel transmission 16B was to be transmitted in the slot 18X, even symbols in the slot 18X that do not overlap with the uplink control channel resource 20A for the single-slot uplink control channel transmission 16A. Notice here that, in some embodiments, the multi-slot uplink control channel transmission 16B is dropped only in the slot 18X in which the overlap occurs; the multi-slot uplink control channel transmission 16B is still transmitted (i.e., not dropped) in other slots 18X-1 and 18X+A in which the overlap does not occur. In other embodiments, though, the multi-slot uplink control channel transmission 16B is dropped in each of the slots 18X-1, 18X, and 18X+A in which it was to be transmitted.

On the other hand, if the UCI carried by the single-slot uplink control channel transmission 16A has the same priority as the UCI carried by the multi-slot uplink control channel transmission 16B in the slot 18X, the wireless device 12 drops a certain one of the single-slot uplink control channel transmission 16A and the multi-slot uplink control channel transmission 16B. The certain one of the single-slot uplink control channel transmission 16A and the multi-slot uplink control channel transmission 16B is the multi-slot uplink control channel transmission 16B in some embodiments. In this case, then, the wireless device 12 drops the multi-slot uplink control channel transmission 16B in slot 18X if the UCI carried by the single-slot uplink control channel transmission 16A has the same priority as the UCI carried by the multi-slot uplink control channel transmission 16B. FIG. 3A shows one such example where the multi-slot uplink control channel transmission 16B is dropped in slot 18X, because the HARQ-ACK carried by the multi-slot uplink control channel transmission 16B has the same priority as the HARQ-ACK carried by the single-slot uplink control channel transmission 16A.

In other embodiments, the certain one of the single-slot uplink control channel transmission 16A and the multi-slot uplink control channel transmission 16B that is dropped is the single-slot uplink control channel transmission 16A. In this case, then, the wireless device 12 drops the single-slot uplink control channel transmission 16A in slot 18X if the UCI carried by the single-slot uplink control channel transmission 16A has the same priority as the UCI carried by the multi-slot uplink control channel transmission 16B. FIG. 3B shows one such example where the single-slot uplink control channel transmission 16A is dropped in slot 18X, because the SR carried by the multi-slot uplink control channel transmission 16B has the same priority as the SR carried by the single-slot uplink control channel transmission 16A.

Note, then, that in some embodiments where the UCI carried by the transmissions 16A, 16B has the same priority, which certain one of the single-slot uplink control channel transmission 16A and the multi-slot uplink control channel transmission 16B is dropped in the slot 18X does not depend on UCI priority. In fact, in some embodiments, which certain one of the single-slot uplink control channel transmission 16A and the multi-slot uplink control channel transmission 16B is dropped may be unconditional or fixed. This may for example be unconditional or fixed in the sense that the certain one of the transmissions 16A, 16B is always dropped when the UCI carried by the transmissions 16A, 16B has the same priority. As one example in this regard, the single-slot uplink control channel transmission 16A may always be dropped when the UCI carried by the transmissions 16A, 16B has the same priority. Especially if the multi-slot uplink control channel transmission 16B would always have started before the single-slot uplink control channel transmission 16A, this advantageously means the wireless device 12 can simply continue transmitting the multi-slot uplink control channel transmission 16B, rather than having to switch from the multi-slot uplink control channel transmission 16B to the single-slot uplink control channel transmission 16A and back again in slot 18X. This example thereby simplifies wireless device transmission.

Note further that the base station 14 may employ similar rules for deciding which of the multi-slot uplink control channel transmission 16B and the single-slot uplink control channel transmission 16A to receive in the slot 18X.

Figure 4:
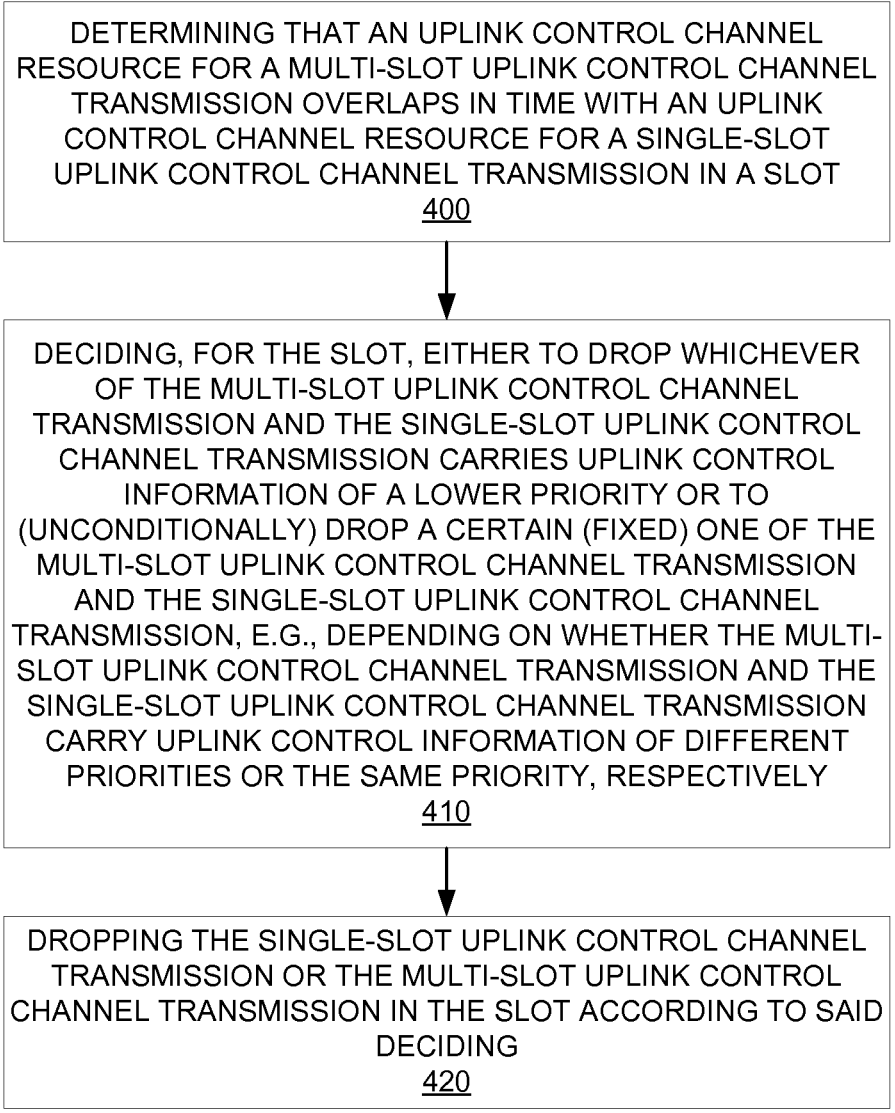
FIG. 4 is a logic flow diagram of a method performed by a wireless device according to some embodiments.

In view of the above, FIG. 4 depicts a method performed by a wireless device 12 configured for use in a wireless communication system 10 in accordance with particular embodiments. The method includes determining that an uplink control channel resource 20B for a multi-slot uplink control channel transmission 16B overlaps in time with an uplink control channel resource 20A for a single-slot uplink control channel transmission 16A in a slot 18X (Block 400). The method further includes deciding (for the slot 18X) either to drop whichever of the multi-slot uplink control channel transmission 16B and the single-slot uplink control channel transmission 16A carries uplink control information of a lower priority or to (unconditionally) drop a certain (fixed) one of the multi-slot uplink control channel transmission 16B and the single-slot uplink control channel transmission 16A, e.g., depending on whether the multi-slot uplink control channel transmission 16B and the single-slot uplink control channel transmission 16A carry uplink control information of different priorities or the same priority, respectively (Block 410). The method also includes dropping the single-slot uplink control channel transmission 16A or the multi-slot uplink control channel transmission 16B in the slot 18X according to said deciding (Block 420).

In some embodiments, the certain one of the multi-slot uplink control channel transmission 16B and the single-slot uplink control channel transmission 16A is the single-slot uplink control channel transmission 16A. In other embodiments, the certain one of the multi-slot uplink control channel transmission 16B and the single-slot uplink control channel transmission 16A is the multi-slot uplink control channel transmission 16B.

In some embodiments, the uplink control channel resource 20B for the multi-slot uplink control channel transmission 16B comprises a physical uplink control channel (PUCCH) resource for a multi-slot PUCCH transmission. Alternatively or additionally, the uplink control channel resource 20A for the single-slot uplink control channel transmission 16A in some embodiments comprises a PUCCH resource for a single-slot PUCCH transmission.

In some embodiments, the wireless communication system 10 is a 5G system or a New Radio, NR, system.

Figure 5:
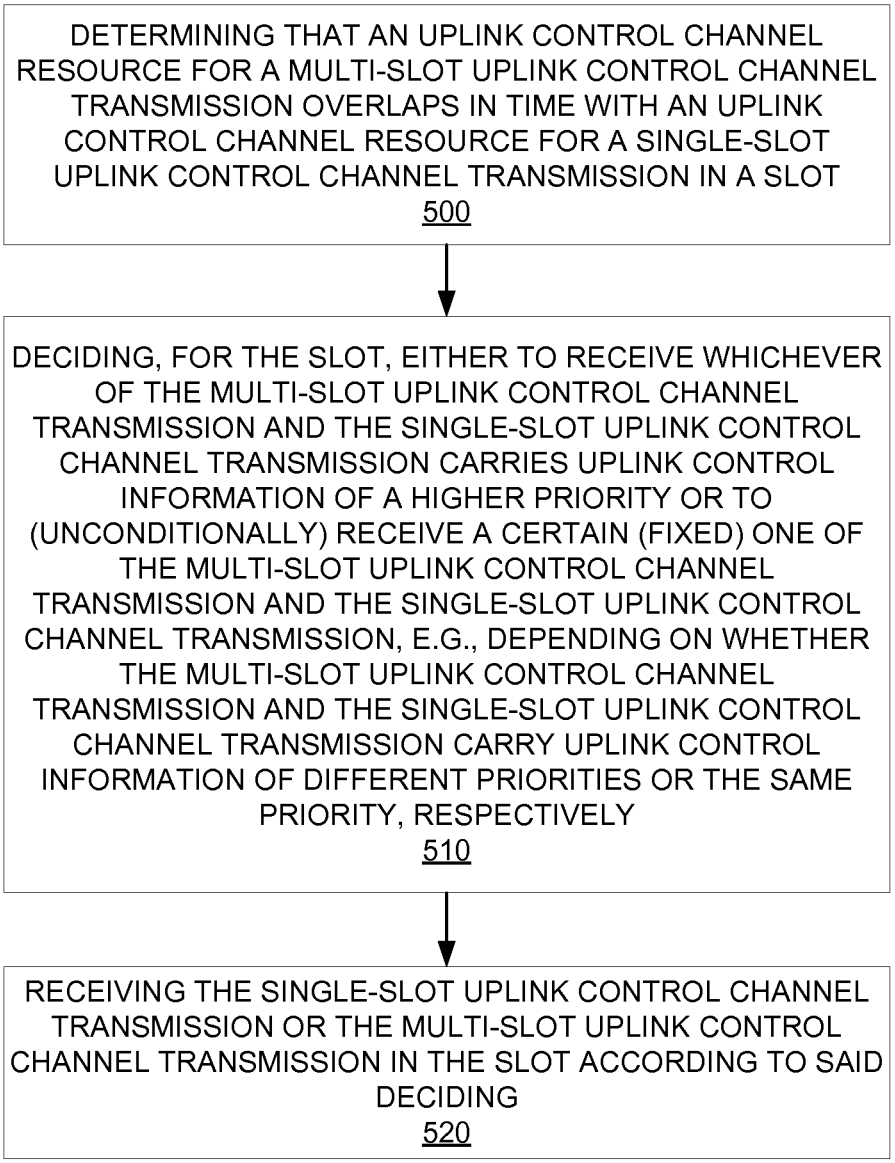
FIG. 5 is a logic flow diagram of a method performed by a base station according to some embodiments.

FIG. 5 depicts a method performed by a base station 14 configured for use in a wireless communication system 10 in accordance with other particular embodiments. The method includes determining that an uplink control channel resource 20B for a multi-slot uplink control channel transmission 16B overlaps in time with an uplink control channel resource 20A for a single-slot uplink control channel transmission 16A in a slot 18X (Block 500). The method also includes deciding (for the slot 18X) either to receive whichever of the multi-slot uplink control channel transmission 16B and the single-slot uplink control channel transmission 16A carries uplink control information of a higher priority or to (unconditionally) receive a certain (fixed) one of the multi-slot uplink control channel transmission 16B and the single-slot uplink control channel transmission 16A, e.g., depending on whether the multi-slot uplink control channel transmission 16B and the single-slot uplink control channel transmission 16A carry uplink control information of different priorities or the same priority, respectively (Block 510). The method further includes receiving the single-slot uplink control channel transmission 16A or the multi-slot uplink control channel transmission 16B in the slot 18X according to said deciding (Block 520).

In some embodiments, the certain one of the multi-slot uplink control channel transmission 16B and the single-slot uplink control channel transmission 16A is the single-slot uplink control channel transmission 16A. In other embodiments, the certain one of the multi-slot uplink control channel transmission 16B and the single-slot uplink control channel transmission 16A is the multi-slot uplink control channel transmission 16B.

In some embodiments, the uplink control channel resource 20B for the multi-slot uplink control channel transmission 16B comprises a physical uplink control channel (PUCCH) resource for a multi-slot PUCCH transmission. Alternatively or additionally, the uplink control channel resource 20A for the single-slot uplink control channel transmission 16A in some embodiments comprises a PUCCH resource for a single-slot PUCCH transmission.

In some embodiments, the wireless communication system 10 is a 5G system or a New Radio, NR, system.

According to yet other embodiments herein, the wireless device 12 determines whether all or some of the uplink control information from both the multi-slot uplink control channel transmission 16B and the single-slot uplink control channel transmission 16A can be transmitted despite this overlap, e.g., according to some transmission strategy such as multiplexing. If not, only then may the wireless device 12 resort to dropping some or all of the uplink control information from the multi-slot uplink control channel transmission 16B or the single-slot uplink control channel transmission 16A.

More particularly, in some embodiments, the wireless device 12 determines that the uplink control channel resource 20B for the multi-slot uplink control channel transmission 16B overlaps in time with the uplink control channel resource 20A for the single-slot uplink control channel transmission 16A in the slot 18X. The wireless device 12 determines whether or not to perform uplink control information multiplexing in the slot 18X by multiplexing uplink control information from the multi-slot uplink control channel transmission 16B with uplink control information from the single-slot uplink control channel transmission 16A in the slot 18X. If it determines to do so, the wireless device 12 performs this uplink control information multiplexing in the slot 18X. If it does not determine to do so, the wireless device 12 drops either the single-slot uplink control channel transmission 16A (with its or corresponding uplink control information) or the multi-slot uplink control channel transmission 16B (with its or corresponding uplink control information) in the slot 18X. Or, stated another way, the wireless device 12 drops either the single-slot uplink control channel resource 20A (i.e., the uplink control channel resource 20A for the single-slot uplink control channel transmission 16A) with its (or corresponding) uplink control information or the multi-slot uplink control channel resource 20B (i.e., the uplink control channel resource 20B for the multi-slot uplink control channel transmission 16B) with its (or corresponding) uplink control information for transmission in the slot 18X.

Figure 6:
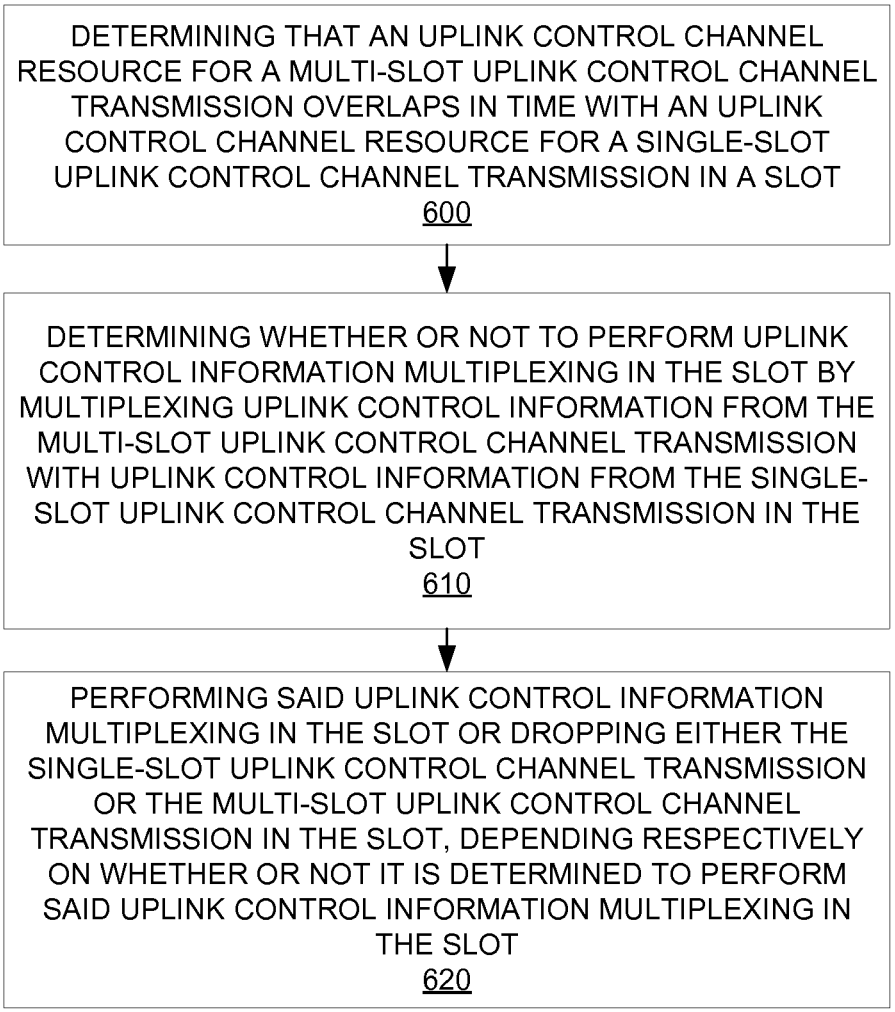
FIG. 6 is a logic flow diagram of a method performed by a wireless device according to other embodiments.

In view of the above modifications and variations, FIG. 6 depicts a method performed by a wireless device 12 configured for use in a wireless communication system 10 in accordance with particular embodiments. The method includes determining that an uplink control channel resource 20B for a multi-slot uplink control channel transmission 16B overlaps in time with an uplink control channel resource 20A for a single-slot uplink control channel transmission 16A in a slot 18X (Block 600). The method also includes determining whether or not to perform uplink control information multiplexing in the slot 18X by multiplexing uplink control information from the multi-slot uplink control channel transmission 16B with uplink control information from the single-slot uplink control channel transmission 16A in the slot 18X (Block 610). The method further includes performing said uplink control information multiplexing in the slot or dropping either the single-slot uplink control channel transmission 16A (with its or corresponding uplink control information) or the multi-slot uplink control channel transmission 16B (with its or corresponding uplink control information) in the slot 18X, depending respectively on whether or not it is determined to perform said uplink control information multiplexing in the slot 18X (Block 620). Although not shown, Block 620 may instead be stated as performing said uplink control information multiplexing in the slot 18X or dropping either the single-slot uplink control channel resource 20A (i.e., the uplink control channel resource for the single-slot uplink control channel transmission 16A) with its (or corresponding) uplink control information or the multi-slot uplink control channel resource 20B (i.e., the uplink control channel resource for the multi-slot uplink control channel transmission 16B) with its (or corresponding) uplink control information for transmission in the slot 18X, depending respectively on whether or not it is determined to perform said uplink control information multiplexing in the slot 18X.

In some embodiments, determining whether or not to perform uplink control information multiplexing in the slot 18X comprises determining an uplink control channel resource in which uplink control information from the multi-slot uplink control channel transmission 16B would be multiplexed with uplink control information from the single-slot uplink control channel transmission 16A in the slot 18X. The determination may then comprise determining whether or not to perform uplink control information multiplexing in the slot 18X by respectively determining whether or not all symbols of the determined uplink control channel resource are either flexible symbols or uplink symbols.

In other embodiments, determining whether or not to perform uplink control information multiplexing in the slot 18X comprises determining an uplink control channel resource in which uplink control information from the multi-slot uplink control channel transmission 16B would be multiplexed with uplink control information from the single-slot uplink control channel transmission 16A in the slot 18X. The determination may then comprise determining whether or not to perform uplink control information multiplexing in the slot 18X by respectively determining whether or not a format of the determined uplink control channel resource is the same as a format of the uplink control channel resource for the multi-slot uplink control channel transmission 16B.

In either case, in some embodiments, the uplink control channel resource for the multi-slot uplink control channel transmission 16B comprises a physical uplink control channel (PUCCH) resource for a multi-slot PUCCH transmission, and the uplink control channel resource for the single-slot uplink control channel transmission 16A comprises a PUCCH resource for a single-slot PUCCH transmission. Moreover, the determined uplink control channel resource may be a determined PUCCH resource. Determining the uplink control channel resource may comprise, if the PUCCH resource for the multi-slot PUCCH transmission or the PUCCH resource for the single-slot PUCCH transmission is a PUCCH resource for HARQ-ACK corresponding to Physical Downlink Shared Channels (PDSCHs) scheduled by a Downlink Control Information (DCI), determining a PUCCH resource set based on the total number of UCI bits to be multiplexed, and determining the determined PUCCH resource as a PUCCH resource in the set for UCI multiplexing based on a PUCCH-resource-indicator field in the DCI. Or, determining the uplink control channel resource may comprise, if the PUCCH resource for the multi-slot PUCCH transmission or the PUCCH resource for the single-slot PUCCH transmission include only HARQ-ACK resources and SR, determining the determined PUCCH resource as the HARQ-ACK PUCCH resource. Or, determining the uplink control channel resource may comprise, if the PUCCH resource for the multi-slot PUCCH transmission or the PUCCH resource for the single-slot PUCCH transmission include only PUCCH resources for CSI, determining the determined PUCCH resource as a CSI PUCCH resource. Or, determining the uplink control channel resource may comprise, if the PUCCH resource for the multi-slot PUCCH transmission or the PUCCH resource for the single-slot PUCCH transmission include only PUCCH resources for CSI and SR, determining the determined PUCCH resource as a CSI PUCCH resource.

In other embodiments, the determination of whether or not to perform uplink control information multiplexing in the slot 18X may comprise determining to perform uplink control information multiplexing in the slot 18X (only) if: (i) at least one of the uplink control channel resource 20B for the multi-slot uplink control channel transmission 16B and the uplink control channel resource 20A for the single-slot uplink control channel transmission 16A carries acknowledgement information corresponding to one or more scheduled downlink transmissions; and (ii) a first uplink control channel resource set determined based on total uplink control information is the same as a second uplink control channel resource set determined based on the acknowledgement information (carried by the least one of the uplink control channel resource 20B for the multi-slot uplink control channel transmission 16B and the uplink control channel resource 20A for the single-slot uplink control channel transmission 16A). Here, the total uplink control information includes both the uplink control information from the multi-slot uplink control channel transmission 16B and the uplink control information from the single-slot uplink control channel transmission 16A in the slot 18X. In one such embodiment, for example, performing said uplink control information multiplexing in the slot 18X comprises multiplexing the total uplink control information on an uplink control channel resource in the first uplink control channel resource set.

In some embodiments, dropping either the single-slot or multi-slot uplink control channel transmission in the slot 18X comprises (unconditionally) dropping the single-slot uplink control channel transmission 16A. In other embodiments, dropping either the single-slot or multi-slot uplink control channel transmission in the slot 18X comprises (unconditionally) dropping the multi-slot uplink control channel transmission 16B.

In some embodiments, the method further comprises determining which of the single-slot uplink control channel transmission 16A and the multi-slot uplink control channel transmission 16B to drop in the slot 18X, based on comparing a priority of the uplink control information carried by the multi-slot uplink control channel transmission 16B with a priority of the uplink control information carried by the single-slot uplink control channel transmission 16A.

In some embodiments, the method further comprises determining which of the single-slot uplink control channel transmission 16A and the multi-slot uplink control channel transmission 16B to drop in the slot 18X, by determining to drop whichever of the single-slot uplink control channel transmission 16A and the multi-slot uplink control channel transmission 16B carries uplink control information of lower priority.

In some embodiments, the uplink control channel resource 20B for the multi-slot uplink control channel transmission 16B comprises a physical uplink control channel (PUCCH) resource for a multi-slot PUCCH transmission. Alternatively or additionally, the uplink control channel resource 20A for the single-slot uplink control channel transmission 16A in some embodiments comprises a PUCCH resource for a single-slot PUCCH transmission.

In some embodiments, the wireless communication system 10 is a 5G system or a New Radio, NR, system.

Figure 7:
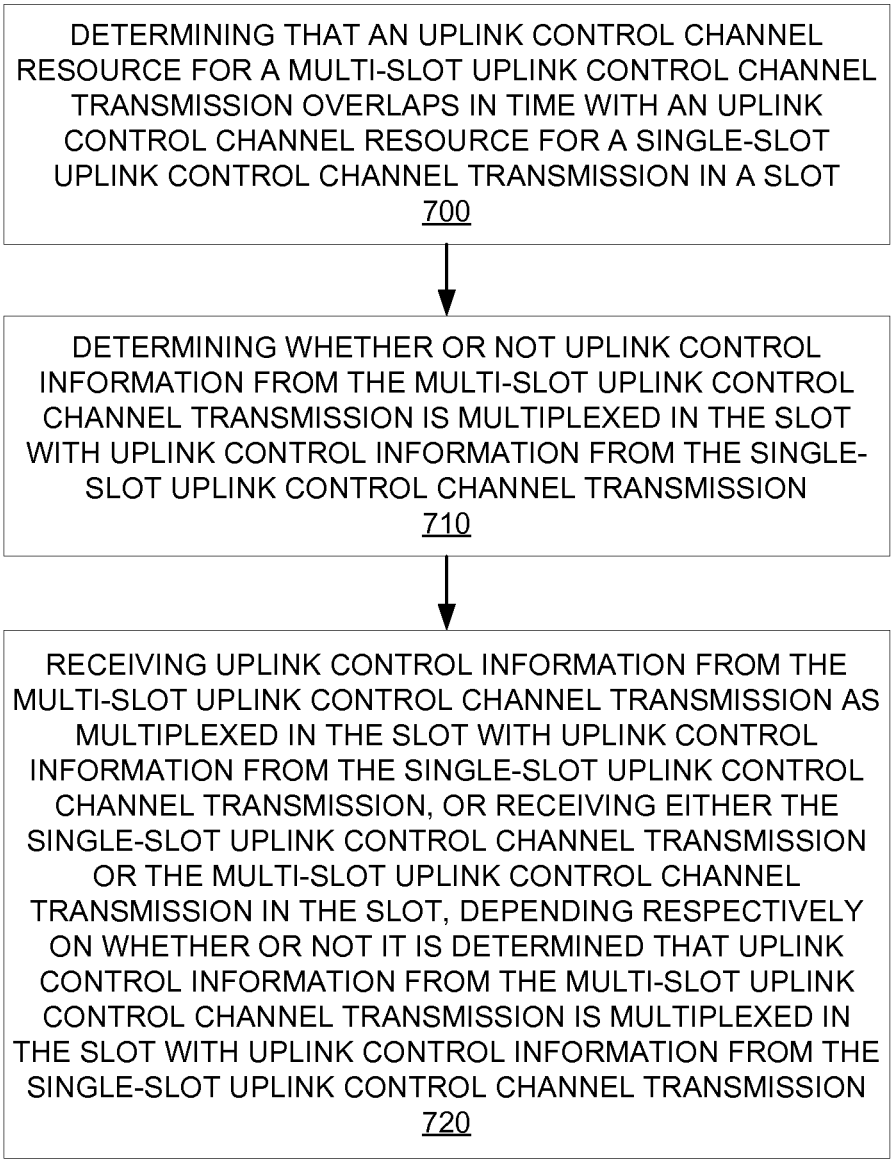
FIG. 7 is a logic flow diagram of a method performed by a base station according to other embodiments.

FIG. 7 depicts a method performed by a base station 14 configured for use in a wireless communication system 10 in accordance with other particular embodiments. The method includes determining that an uplink control channel resource 20B for a multi-slot uplink control channel transmission 16B overlaps in time with an uplink control channel resource 20A for a single-slot uplink control channel transmission 16A in a slot 18X (block 700). The method also includes determining whether or not uplink control information from the multi-slot uplink control channel transmission 16B is multiplexed in the slot 18X with uplink control information from the single-slot uplink control channel transmission 16A (Block 710). The method further includes receiving uplink control information from the multi-slot uplink control channel transmission 16B as multiplexed in the slot 18X with uplink control information from the single-slot uplink control channel transmission 16A, or receiving either the single-slot uplink control channel transmission 16A or the multi-slot uplink control channel transmission 16B in the slot 18X, depending respectively on whether or not it is determined that uplink control information from the multi-slot uplink control channel transmission 16B is multiplexed in the slot 18X with uplink control information from the single-slot uplink control channel transmission 16A (Block 720).

In some embodiments, determining whether or not uplink control information from the multi-slot uplink control channel transmission 16B is multiplexed in the slot 18X with uplink control information from the single-slot uplink control channel transmission 16A comprises determining an uplink control channel resource in which uplink control information from the multi-slot uplink control channel transmission 16B would be multiplexed with uplink control information from the single-slot uplink control channel transmission 16A in the slot 18X. The determination may then comprise determining whether or not uplink control information from the multi-slot uplink control channel transmission 16B is multiplexed in the slot 18X with uplink control information from the single-slot uplink control channel transmission 16A by respectively determining whether or not all symbols of the determined uplink control channel resource are either flexible symbols or uplink symbols.

In other embodiments, determining whether or not uplink control information from the multi-slot uplink control channel transmission 16B is multiplexed in the slot 18X with uplink control information from the single-slot uplink control channel transmission 16A comprises determining an uplink control channel resource in which uplink control information from the multi-slot uplink control channel transmission 16B would be multiplexed with uplink control information from the single-slot uplink control channel transmission 16A in the slot 18X. The determination may then comprise determining whether or not uplink control information from the multi-slot uplink control channel transmission 16B is multiplexed in the slot 18X with uplink control information from the single-slot uplink control channel transmission 16A by respectively determining whether or not a format of the determined uplink control channel resource is the same as a format of the uplink control channel resource for the multi-slot uplink control channel transmission 16B.

In either case, in some embodiments, the uplink control channel resource for the multi-slot uplink control channel transmission 16B comprises a physical uplink control channel (PUCCH) resource for a multi-slot PUCCH transmission, and the uplink control channel resource for the single-slot uplink control channel transmission 16A comprises a PUCCH resource for a single-slot PUCCH transmission. Moreover, the determined uplink control channel resource may be a determined PUCCH resource. Determining the uplink control channel resource may comprise, if the PUCCH resource for the multi-slot PUCCH transmission or the PUCCH resource for the single-slot PUCCH transmission is a PUCCH resource for HARQ-ACK corresponding to Physical Downlink Shared Channels (PDSCHs) scheduled by a Downlink Control Information (DCI), determining a PUCCH resource set based on the total number of UCI bits to be multiplexed, and determining the determined PUCCH resource as a PUCCH resource in the set for UCI multiplexing based on a PUCCH-resource-indicator field in the DCI. Or, determining the uplink control channel resource may comprise, if the PUCCH resource for the multi-slot PUCCH transmission or the PUCCH resource for the single-slot PUCCH transmission include only HARQ-ACK resources and SR, determining the determined PUCCH resource as the HARQ-ACK PUCCH resource. Or, determining the uplink control channel resource may comprise, if the PUCCH resource for the multi-slot PUCCH transmission or the PUCCH resource for the single-slot PUCCH transmission include only PUCCH resources for CSI, determining the determined PUCCH resource as a CSI PUCCH resource. Or, determining the uplink control channel resource may comprise, if the PUCCH resource for the multi-slot PUCCH transmission or the PUCCH resource for the single-slot PUCCH transmission include only PUCCH resources for CSI and SR, determining the determined PUCCH resource as a CSI PUCCH resource.

In other embodiments, the determination of whether or not uplink control information from the multi-slot uplink control channel transmission 16B is multiplexed in the slot 18X with uplink control information from the single-slot uplink control channel transmission 16A may comprise determining that uplink control information from the multi-slot uplink control channel transmission 16B is multiplexed in the slot 18X with uplink control information from the single-slot uplink control channel transmission 16A (only) if: (i) at least one of the uplink control channel resource 20B for the multi-slot uplink control channel transmission 16B and the uplink control channel resource 20A for the single-slot uplink control channel transmission 16A carries acknowledgement information corresponding to one or more scheduled downlink transmissions; and (ii) a first uplink control channel resource set determined based on total uplink control information is the same as a second uplink control channel resource set determined based on the acknowledgement information (carried by the least one of the uplink control channel resource 20B for the multi-slot uplink control channel transmission 16B and the uplink control channel resource 20A for the single-slot uplink control channel transmission 16A). Here, the total uplink control information includes both the uplink control information from the multi-slot uplink control channel transmission 16B and the uplink control information from the single-slot uplink control channel transmission 16A in the slot 18X. In one such embodiment, for example, uplink control information from the multi-slot uplink control channel transmission 16B is multiplexed in the slot 18X with uplink control information from the single-slot uplink control channel transmission 16A by multiplexing the total uplink control information on an uplink control channel resource in the first uplink control channel resource set.

In some embodiments, receiving either the single-slot uplink control channel transmission 16A or the multi-slot uplink control channel transmission 16B in the slot 18X comprises (unconditionally) receiving the multi-slot uplink control channel transmission 16B. In other embodiments, receiving either the single-slot uplink control channel transmission 16A or the multi-slot uplink control channel transmission 16B in the slot 18X comprises (unconditionally) receiving the single-slot uplink control channel transmission 16A.

In some embodiments, the method further comprises determining which of the single-slot uplink control channel transmission 16A and the multi-slot uplink control channel transmission 16B to receive in the slot 18X, based on comparing a priority of the uplink control information carried by the multi-slot uplink control channel transmission 16B with a priority of the uplink control information carried by the single-slot uplink control channel transmission 16A.

In some embodiments, the method further comprises determining which of the single-slot uplink control channel transmission 16A and the multi-slot uplink control channel transmission 16B to receive in the slot 18X, by determining to receive whichever of the single-slot uplink control channel transmission 16A and the multi-slot uplink control channel transmission 16B carries uplink control information of higher priority.

In some embodiments, the uplink control channel resource 20B for the multi-slot uplink control channel transmission 16B comprises a physical uplink control channel (PUCCH) resource for a multi-slot PUCCH transmission. Alternatively or additionally, the uplink control channel resource 20A for the single-slot uplink control channel transmission 16A in some embodiments comprises a PUCCH resource for a single-slot PUCCH transmission.

In some embodiments, the wireless communication system 10 is a 5G system or a New Radio, NR, system.

Embodiments herein also include corresponding apparatuses. Embodiments herein for instance include a wireless device 12 configured to perform any of the steps of any of the embodiments described above for the wireless device 12.

Embodiments also include a wireless device 12 comprising processing circuitry and power supply circuitry. The processing circuitry is configured to perform any of the steps of any of the embodiments described above for the wireless device 12. The power supply circuitry is configured to supply power to the wireless device 12.

Embodiments further include a wireless device 12 comprising processing circuitry. The processing circuitry is configured to perform any of the steps of any of the embodiments described above for the wireless device 12. In some embodiments, the wireless device 12 further comprises communication circuitry.

Embodiments further include a wireless device 12 comprising processing circuitry and memory. The memory contains instructions executable by the processing circuitry whereby the wireless device 12 is configured to perform any of the steps of any of the embodiments described above for the wireless device 12.

Embodiments moreover include a user equipment (UE). The UE comprises an antenna configured to send and receive wireless signals. The UE also comprises radio frontend circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 14 configured to perform any of the steps of any of the embodiments described above for the radio network node 14.

Embodiments also include a radio network node 14 comprising processing circuitry and power supply circuitry. The processing circuitry is configured to perform any of the steps of any of the embodiments described above for the radio network node 14. The power supply circuitry is configured to supply power to the radio network node 14.

Embodiments further include a radio network node 14 comprising processing circuitry. The processing circuitry is configured to perform any of the steps of any of the embodiments described above for the radio network node 14. In some embodiments, the radio network node 14 further comprises communication circuitry.

Embodiments further include a radio network node 14 comprising processing circuitry and memory. The memory contains instructions executable by the processing circuitry whereby the radio network node 14 is configured to perform any of the steps of any of the embodiments described above for the radio network node 14.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
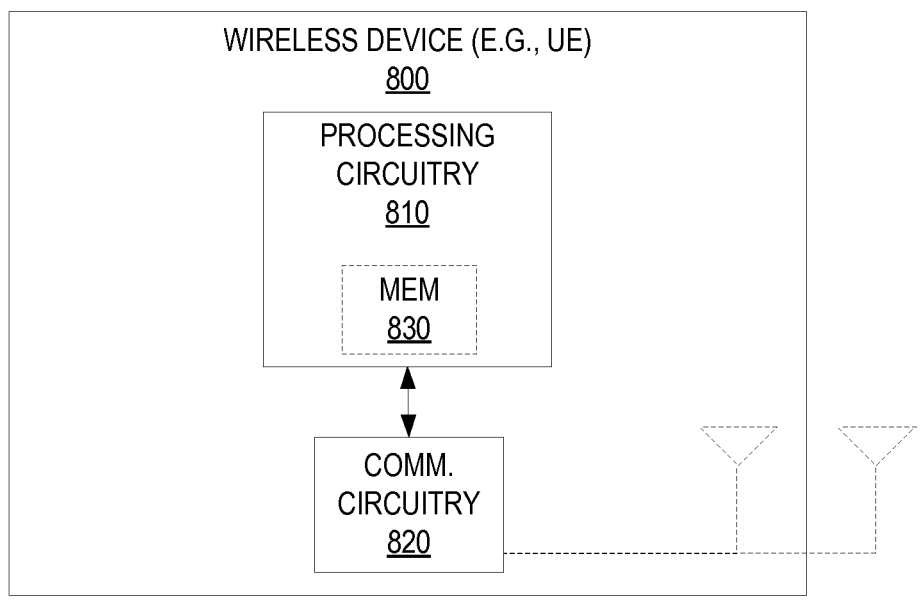
FIG. 8 is a block diagram of a wireless device according to some embodiments.

FIG. 8 for example illustrates a wireless device 800 (e.g., wireless device 12) as implemented in accordance with one or more embodiments. As shown, the wireless device 800 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the wireless device 800. The processing circuitry 810 is configured to perform processing described above, e.g., in FIGS. 6 and/or 4, such as by executing instructions stored in memory 830. The processing circuitry 810 in this regard may implement certain functional means, units, or modules.

Figure 9A:
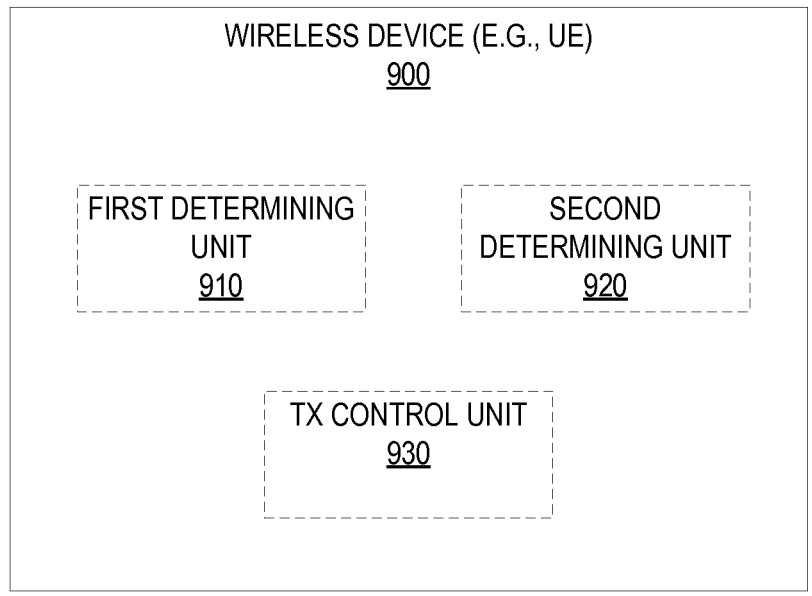
FIG. 9A is a block diagram of a wireless device according to other embodiments.
Figure 12:
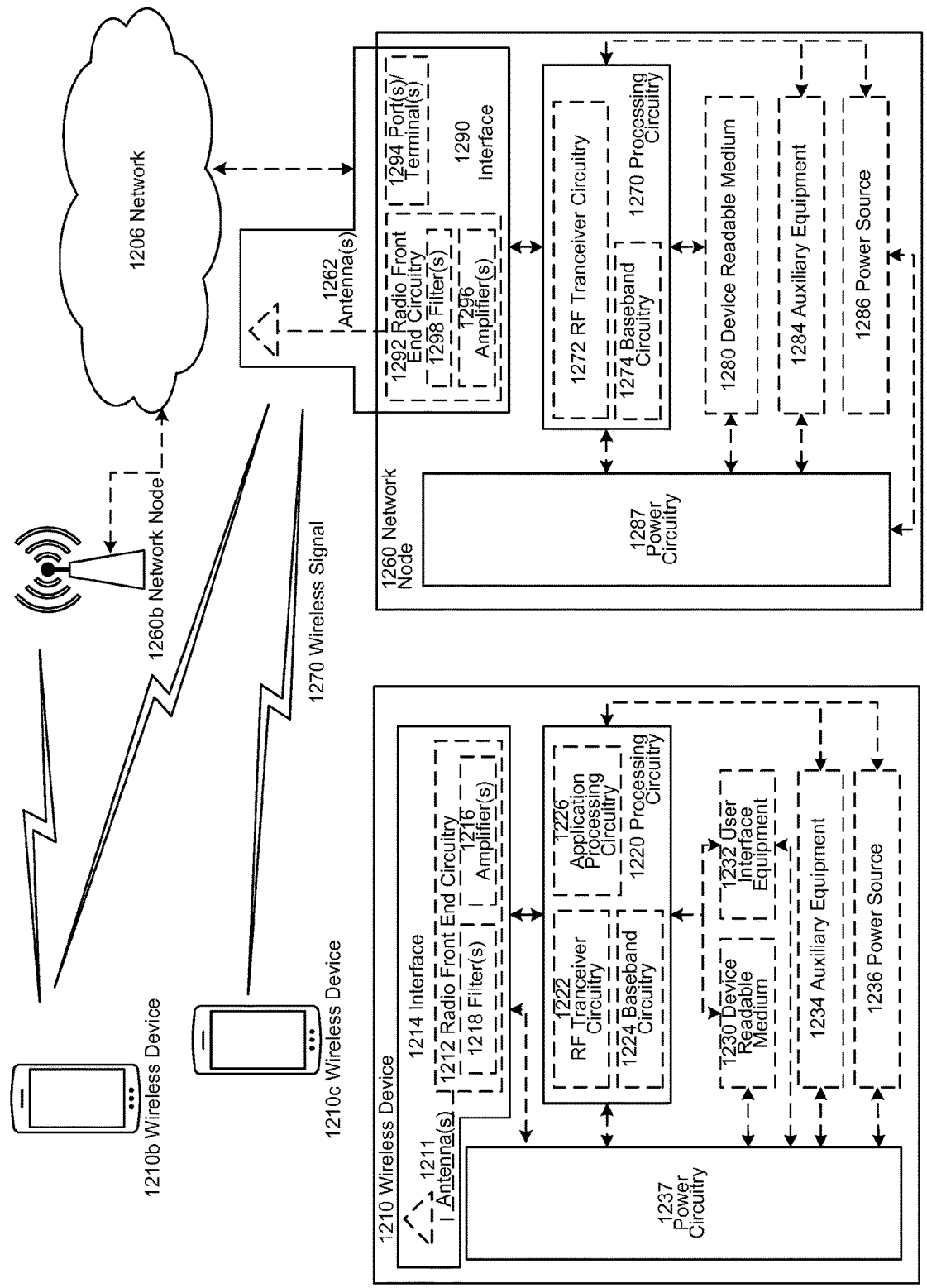
FIG. 12 is a block diagram of a wireless communication network according to some embodiments.

FIG. 9A illustrates a schematic block diagram of a wireless device 900 (e.g., wireless device 12) in a wireless network according to still other embodiments (for example, the wireless network shown in FIG. 12). As shown, the wireless device 900 implements various functional means, units, or modules, e.g., via the processing circuitry 810 in FIG. 8 and/or via software code. These functional means, units, or modules, e.g., for implementing the method of FIG. 6 herein, include for instance a first determining unit 910 for determining that an uplink control channel resource 20B for a multi-slot uplink control channel transmission 16B overlaps in time with an uplink control channel resource 20A for a single-slot uplink control channel transmission 16A in a slot 18X. Also included may be a second determining unit 920 for determining whether or not to perform uplink control information multiplexing in the slot 18X by multiplexing uplink control information from the multi-slot uplink control channel transmission 16B with uplink control information from the single-slot uplink control channel transmission 16A in the slot 18X. Further included may be a transmission (TX) control unit 930 for performing said uplink control information multiplexing in the slot or dropping either the single-slot uplink control channel transmission 16A or the multi-slot uplink control channel transmission 16B in the slot 18X, depending respectively on whether or not it is determined to perform said uplink control information multiplexing in the slot 18X.

Figure 9B:
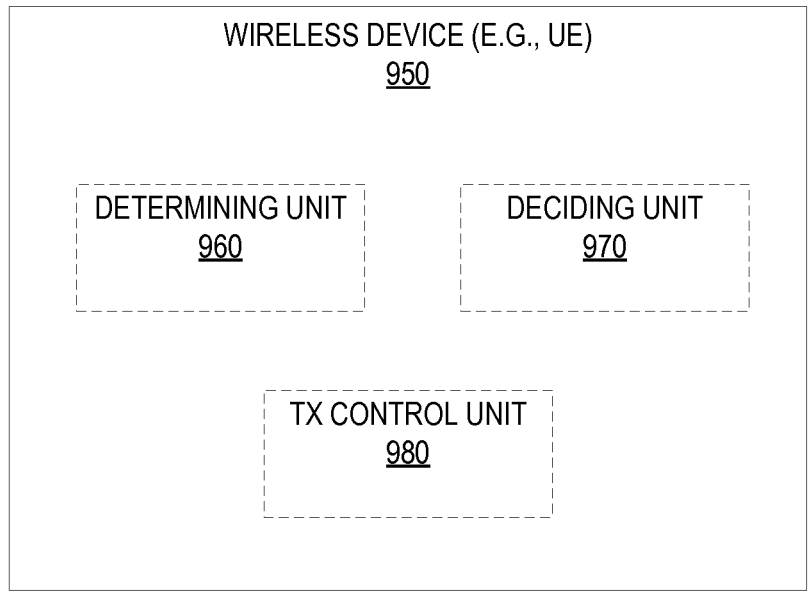
FIG. 9B is a block diagram of a wireless device according to yet other embodiments.

FIG. 9B illustrates a schematic block diagram of a wireless device 950 (e.g., wireless device 12) in a wireless network according to yet other embodiments (for example, the wireless network shown in FIG. 12). As shown, the wireless device 950 implements various functional means, units, or modules, e.g., via the processing circuitry 810 in FIG. 8 and/or via software code. These functional means, units, or modules, e.g., for implementing the method of FIG. 4 herein, include for instance a determining unit 960 for determining that an uplink control channel resource 20B for a multi-slot uplink control channel transmission 16B overlaps in time with an uplink control channel resource 20A for a single-slot uplink control channel transmission 16A in a slot 18X. Also included may be a deciding unit 970 for deciding either to drop whichever of the multi-slot uplink control channel transmission 16B and the single-slot uplink control channel transmission 16A carries uplink control information of a lower priority or to (unconditionally) drop a certain (fixed) one of the multi-slot uplink control channel transmission 16B and the single-slot uplink control channel transmission 16A, e.g., depending on whether the multi-slot uplink control channel transmission 16B and the single-slot uplink control channel transmission 16A carry uplink control information of different priorities or the same priority, respectively. Further included may be a transmission (TX) control unit 980 for dropping the single-slot uplink control channel transmission 16A or the multi-slot uplink control channel transmission 16B according to said deciding.

Figure 10:
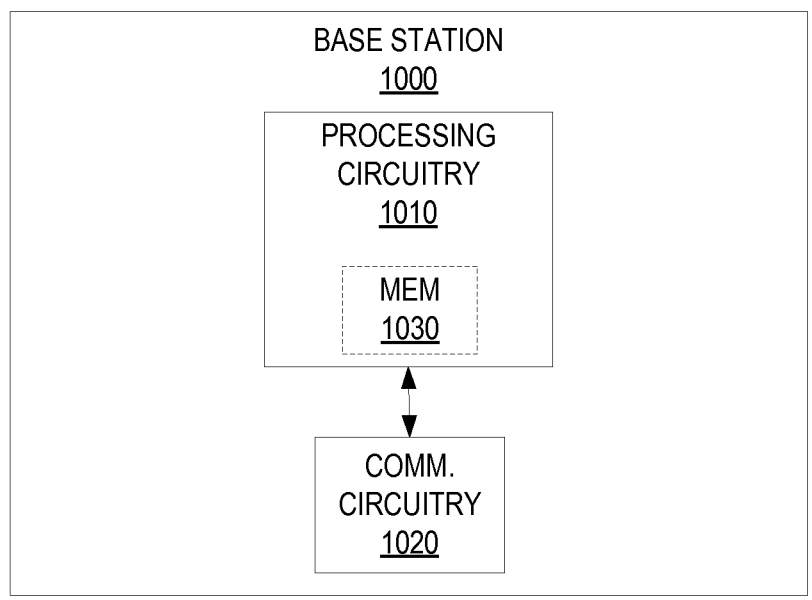
FIG. 10 is a block diagram of a base station according to some embodiments.

FIG. 10 illustrates a base station 1000 (e.g., base station 14) as implemented in accordance with one or more embodiments. As shown, the base station 1000 includes processing circuitry 1010 and communication circuitry 1020. The communication circuitry 1020 is configured to transmit and/or receive information to and/or from one or more other nodes, e.g., via any communication technology. The processing circuitry 1010 is configured to perform processing described above, e.g., in FIGS. 7 and/or 5, such as by executing instructions stored in memory 1030. The processing circuitry 1010 in this regard may implement certain functional means, units, or modules.

Figure 11A:
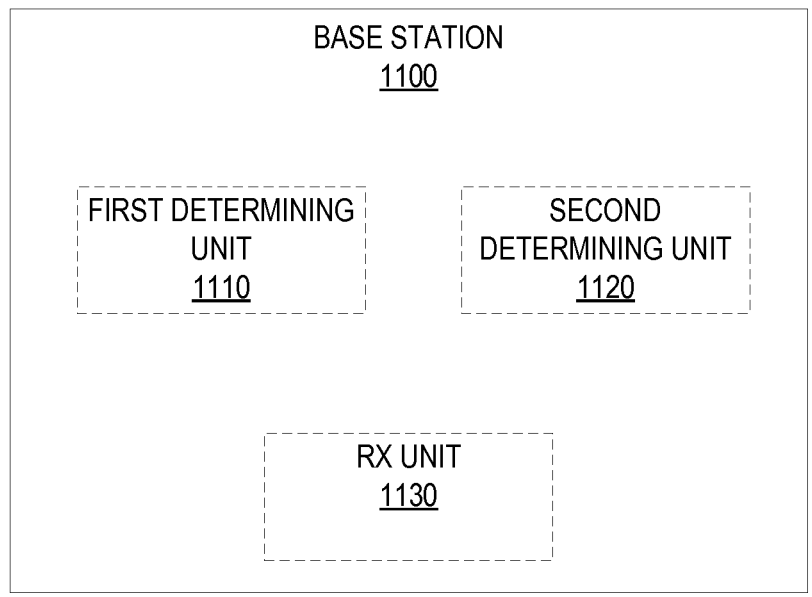
FIG. 11A is a block diagram of a base station according to other embodiments.

FIG. 11A illustrates a schematic block diagram of a base station 1100 (e.g., base station 14) in a wireless network according to still other embodiments (for example, the wireless network shown in FIG. 12). As shown, the base station 1100 implements various functional means, units, or modules, e.g., via the processing circuitry 1010 in FIG. 10 and/or via software code. These functional means, units, or modules, e.g., for implementing the method in FIG. 7 herein, include for instance a first determining unit 1110 for determining that an uplink control channel resource for a multi-slot uplink control channel transmission overlaps in time with an uplink control channel resource for a single-slot uplink control channel transmission in a slot. Also included is a second determining unit 1120 for determining whether or not uplink control information from the multi-slot uplink control channel transmission is multiplexed in the slot with uplink control information from the single-slot uplink control channel transmission. Further included may be a reception (RX) unit 1130 for receiving uplink control information from the multi-slot uplink control channel transmission as multiplexed in the slot with uplink control information from the single-slot uplink control channel transmission, or receiving either the single-slot uplink control channel transmission or the multi-slot uplink control channel transmission in the slot, depending respectively on whether or not it is determined that uplink control information from the multi-slot uplink control channel transmission is multiplexed in the slot with uplink control information from the single-slot uplink control channel transmission.

Figure 11B:
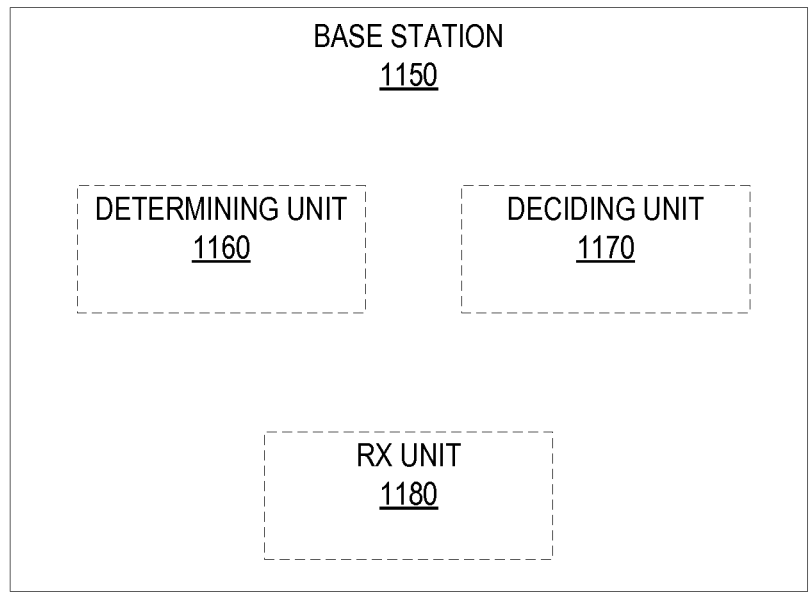
FIG. 11B is a block diagram of a base station according to yet other embodiments.

FIG. 11B illustrates a schematic block diagram of a base station 1150 (e.g., base station 14) in a wireless network according to still other embodiments (for example, the wireless network shown in FIG. 12). As shown, the base station 1150 implements various functional means, units, or modules, e.g., via the processing circuitry 1010 in FIG. 10 and/or via software code. These functional means, units, or modules, e.g., for implementing the method in FIG. 5 herein, include for instance a determining unit 1160 for determining that an uplink control channel resource for a multi-slot uplink control channel transmission overlaps in time with an uplink control channel resource for a single-slot uplink control channel transmission in a slot. Also included is a deciding unit 1170 for deciding either to receive whichever of the multi-slot uplink control channel transmission and the single-slot uplink control channel transmission carries uplink control information of a higher priority or to (unconditionally) receive a certain (fixed) one of the multi-slot uplink control channel transmission and the single-slot uplink control channel transmission, depending on whether the multi-slot uplink control channel transmission and the single-slot uplink control channel transmission carry uplink control information of different priorities or the same priority, respectively. Further included may be a reception (RX) unit 1180 for receiving the single-slot uplink control channel transmission or the multi-slot uplink control channel transmission according to said deciding.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

New Radio (NR) physical uplink control channel (PUCCH) design is based on 5 PUCCH formats. PUCCH formats 0 and 2, a.k.a. short PUCCHs, use 1 or 2 Orthogonal Frequency Division Multiplexing (OFDM) symbols while PUCCH formats 1, 3 and 4, a.k.a. long PUCCHs, can use 4 to 14 OFDM symbols. PUCCH formats 0 and 1 carry uplink control information (UCI) payloads of 1 or 2 bits while other formats are used for carrying UCI payloads of more than 2 bits. In PUCCH formats 1, 3 and 4, symbols with demodulation reference signal (DMRS) are time division multiplexed with UCI symbols to maintain low peak-to-average-power-ratio (PAPR) while in format 2, DMRS is frequency-multiplexed with data-carrying subcarriers. Multi-user multiplexing on the same time and frequency resources is supported only for PUCCH format 0, 1, and 4 by means of different cyclic shifts or orthogonal cover codes (OCC) when applicable.

A user equipment (UE) can be configured with PUCCH resources for channel state information (CSI) reporting or scheduling request (SR). For UCI transmission including HARQ-ACK bits, a UE may be configured with up to 4 PUCCH resource sets based on the UCI size. The first set can only be used for a maximum of 2 HARQ-ACK bits (with a maximum of 32 PUCCH resources) and other sets are applicable for more than 2 bits of UCI (each with a maximum of 8 PUCCH resources). A UE determines the set based on the UCI size, and further indicates a PUCCH resource in the set based on a 3-bit field in DCI (complemented with an implicit rule for the first set with more than 8 resources).

A PUCCH resource has a starting symbol and duration and its transmission is confined within a slot. A UE determines a slot for a PUCCH transmission via configuration for SR and CSI reporting in PUCCH, or via a field in downlink (DL) assignment for UCI including HARQ-ACK information.

In a slot, PUCCH resources can overlap with each other. The UE in some embodiments multiplexes the UCI in a PUCCH resource based on the UCI multiplexing rules. If at least one of the PUCCH resources in a group of overlapping PUCCH resources is scheduled by a DCI, the UE needs to check the timeline requirements for UCI multiplexing for overlapping PUCCH resources in order to proceed with multiplexing.

The timeline requirements as well as multiplexing rules are defined in NR Rel-15. Briefly, the timeline for UCI multiplexing requires that the gNB has to provide at least one symbol more than the processing time from the first symbol in the group of overlapping PUCCH resources to the last symbol of corresponding DCI or PDSCH.

For the UCI multiplexing rules, if the group of overlapping PUCCH resources includes a PUCCH resource for HARQ-ACK corresponding to PDSCHs scheduled by a DCI, the UE determines a PUCCH resource set based on the total number of UCI bits to be multiplexed, and a PUCCH resource in the set for UCI multiplexing based on the PUCCH-resource-indicator field in the DCI. If the group of overlapping PUCCH resources include only HARQ-ACK resources and SR, the HARQ-ACK PUCCH resource is used to transmit positive SR. If the group of overlapping PUCCH resources includes only PUCCH resources for CSI, high priority CSI reports are multiplexed in a CSI PUCCH resource. If the group of overlapping PUCCH resources includes only PUCCH resources for CSI and SR, SR are multiplexed on the CSI PUCCH resource.

PUCCH multi-slot transmission can be enabled by radio resource control (RRC) configuration. A long PUCCH format (i.e. PUCCH format 1, 3 or 4) can be configured such that when it is transmitted it is repeated in number of valid slots where the repetition factor is configured by RRC (for example 2,4 or 8). A UE determines a slot to be valid for PUCCH repetition if the symbol aligned with the starting symbol index of the PUCCH resource and the consecutive symbols for the duration of the PUCCH resource, are flexible or uplink symbols. Otherwise, that slot is not a valid slot for repetition of that PUCCH.

When a multi-slot PUCCH resource overlaps with another multi-slot PUCCH resource in one or multiple slots, for UCI with the same priority, the PUCCH that starts in an earlier slot is transmitted. For UCI with different priority, the UCI PUCCH with higher priority is transmitted in overlapping slots if timeline requirement is met. For UCI type priority, it is assumed HARQ-ACK>SR>CSI.

There remains an issue however of how to resolve the case when a multi-slot PUCCH is overlapped with a single-slot PUCCH in a slot. One solution would be to drop the single-slot PUCCH in the overlapping slot. This solution however can result in unnecessary dropping of UCI or dropping prioritized UCI if associated with single slot PUCCH which results in performance degradation. Another solution would be to multiplex the UCI in the overlapping slot. However, the multiplexed UCI may not be possible to be transmitted in a PUCCH if the timeline requirements are not met or if the slot fails to be validated for PUCCH transmission using the new PUCCH resource since at least a symbol in the new PUCCH resource is determined to be is aligned with a DL symbol in the symbol, instead of being flexible or UL symbol.

Some embodiments propose methods to resolve overlapping of a single-slot PUCCH to a multi-slot PUCCH and solutions that overcome the drawback of the other possible solutions mentioned above. Some embodiments for example include methods for improving the dropping-based methods or multiplexing-based methods, such that the impact on the system performance due to overlapping PUCCH resources is reduced.

To achieve the above, it is beneficial to multiplex when possible. However, the introduced complexity should be minimized or at least considered. Dropping rules can be considered instead of multiplexing rules or when multiplexing rules (as in Rel-15) would result in error cases. However, the dropping rules are based on consideration to transmit the UCI that provides improved performance or the UCI that is prioritized. Depending on the aggregation level of the PDCCH, different implicit resource selection behaviors are implemented to select a PUCCH resource.

Certain embodiments may provide one or more of the following technical advantage(s). According to some embodiments, the impact on the system performance due to overlapping PUCCH resources is reduced.

Embodiment 1

When a multi-slot PUCCH overlaps with a single slot PUCCH in a slot, after checking the timeline requirements, if any, for the overlapping PUCCH resources, the UE first determines a PUCCH resource based on the UCI multiplexing rule in Rel-15. According to this embodiment, after determining the PUCCH resource for UCI multiplexing, the UE checks the following conditions: (i) If all symbol indexes in the slot for the new PUCCH resource correspond to flexible or UL symbols, the new PUCCH resource with the multiplexed UCI is transmitted; (ii) Otherwise, preferable, the UE drops the single-slot PUCCH and transmits only the multi-slot PUCCH in that slot. The opposite behavior can be envisioned as well where the UE drops the slot of the multi-slot PUCCH.

Embodiment 2

When a multi-slot PUCCH overlaps with a single slot PUCCH in a slot, after checking the timeline requirements, if any, for the overlapping PUCCH resources, the UE first determines a PUCCH resource based on the UCI multiplexing rule in Rel-15. According to this embodiment, after determining the PUCCH resource for UCI multiplexing, the UE checks the following conditions: (i) If the PUCCH format of the PUCCH resource from UCI multiplexing is the same as the PUCCH format of the multi-slot PUCCH, the UE considers that PUCCH resource for UCI transmission in that slot; (ii) Otherwise, preferable, the UE drops the single-slot PUCCH and transmits only the multi-slot PUCCH in that slot. The opposite behavior can be envisioned as well where the UE drops the slot of the multi-slot PUCCH.

Embodiment 3

When a multi-slot PUCCH overlaps with a single slot PUCCH in a slot, after checking the timeline requirements, if any, for the overlapping PUCCH resources, the UE first determines a PUCCH resource based on the UCI multiplexing rule in Rel-15. According to this embodiment, after determining the PUCCH resource for UCI multiplexing, the UE checks the following: (i) If all symbol indexes in the slot for the new PUCCH resource correspond to flexible or UL symbols, the new PUCCH resource with the multiplexed UCI is transmitted; (ii) Otherwise, the UE transmits the PUCCH resource with the UCI type with the higher priority (assuming HARQ-ACK>SR>CSI). Depending on the UCI type, that PUCCH resource can be the PUCCH resource of the multi-slot PUCCH or the PUCCH resource of the single-slot PUCCH.

Embodiment 4

This embodiment is based on modified dropping rules. When a multi-slot PUCCH overlaps with a single slot PUCCH in a slot: (i) If the UCI priority is different between multi-slot PUCCH and single-slot PUCCH, the UE transmits the PUCCH resource with the UCI type with the higher priority (assuming HARQ-ACK>SR>CSI) in the overlapping slot; (ii) Otherwise, preferable, the UE drops the single-slot PUCCH and transmits only the multi-slot PUCCH in that slot. The opposite behavior can be envisioned as well where the UE drops the slot of the multi-slot PUCCH.

Embodiment 5

When a multi-slot PUCCH overlaps with a single slot PUCCH in a slot: (i) If there is a timeline requirement (i.e. one of the PUCCH resources corresponds to HARQ-ACK transmissions corresponding to PDSCH(s) scheduled by DCI), and if the total UCI (i.e. including HARQ-ACK information) results in a same PUCCH resource set as for the only HARQ-ACK transmission, the UE multiplex the total UCI in the HARQ-ACK only PUCCH resource and does not transmit the other PUCCH resource; (ii) Otherwise, the behavior in any of the previous embodiments or a combination of them can be applied.

In embodiments 1 to 3, if the UE determines that the PUCCH resource with the highest available payload cannot carry the combined UCI payload, the UE can either fallback to transmit the UCI payload of one of the PUCCHs in the overlapping slot (preferable from the multi-slot PUCCH but even the opposite can be envisioned). It is also possible to apply a priority rule to reduce UCI payload until it fits into the PUCCH resource.

Note that, according to some embodiments, the following holds. For transmission, the resource is used. And here, for dropping, if a PUCCH is dropped, it is meant that its corresponding resource with corresponding UCI is not used for transmission.

Note further that, in some embodiments, A PUCCH resource includes the following parameters: (i) a PUCCH resource index provided by higher layer parameter pucch-ResourceId; (ii) an index of the first PRB prior to frequency hopping or for no frequency hopping by higher layer parameter startingPRB; (iii) an index of the first PRB after frequency hopping by higher layer parameter secondHop-PRB; (iv) an indication for intra-slot frequency hopping by higher layer parameter intraSlotFrequencyHopping; and (v) a configuration for a PUCCH format, from PUCCH format 0 through PUCCH format 4, provided by higher layer parameter format.

Also, in some embodiments, for PUCCH formats 1, 3, or 4, a UE can be configured a number of slots, $N_{PUCCH}^{repeat}$, for a PUCCH transmission by respective higher layer parameters nrofSlots. For $N_{PUCCH}^{repeat}>1$, the UE repeats the UCI in the PUCCH transmission in the first slot of the $N_{PUCCH}^{repeat}$ slots in the PUCCH transmission in each of the remaining $N_{PUCCH}^{repeat}-1$ slots. A PUCCH transmission has the same number of consecutive symbols, as provided by higher layer parameter nrofSymbols in PUCCH-format1, nrofSymbols in PUCCH-format3, or nrofSymbols in PUCCH-format4, in each of the $N_{PUCCH}^{repeat}$ Slots. And a PUCCH transmission has a same first symbol, as provided by higher layer parameter startingSymbolIndex in PUCCH-format1, startingSymbolIndex in PUCCH-format3, or startingSymbolIndex in PUCCH-format4, in each of the $N_{PUCCH}^{repeat}$ Slots;

Note there may be different overlapping cases for UL transmissions, including when a multi-slot PUCCH overlaps with a single-slot PUCCH. In general, overlapping for some other cases besides this one may be resolved either based on dropping or multiplexing rules.

With regard to the multiplexing approach in the overlapping slot, consideration should be taken into account in case of the need for determining a new PUCCH resource due to multiplexing. Therefore, for simplicity, it is preferred to adopt dropping rules for overlapping when a multi-slot PUCCH overlaps with a single slot PUCCH by prioritizing multi-slot PUCCH and consider the UCI multiplexing when there is no additional complexity.

In that light, the interesting scenario should include the case where the overlapping PUCCH transmissions include HARQ-ACK bits corresponding to PDSCH scheduled by DCI due to the priority of HARQ-ACK information as compared to the other UCI types. In this case, if the total UCI from the overlapping PUCCH resources indicate the same PUCCH resource set as for the HARQ-ACK only PUCCH resource, the PUCCH resource for UCI multiplexing would be same as the PUCCH resource for HARQ-ACK only since the DCI field points to the same entry in the same PUCCH resource set. Hence, the complexity is minimum and HARQ-ACK transmission is not compromised.

Therefore, some embodiments include the following when a multi-slot PUCCH repetition overlaps with a single PUCCH in a slot. If the timeline requirement for the overlapping slot is met: (i) if one of the PUCCH resources include HARQ-ACK bits and its corresponding PUCCH resource set is the same the PUCCH resource set for the total number of UCI corresponding to the overlapping PUCCH resources, the UE multiplexes the total UCI on the HARQ-ACK PUCCH resource set; (ii) Otherwise, the UE drops the single-slot PUCCH and transmits the PUCCH multi-slot PUCCH in the slot. Otherwise, if the timeline requirement for the overlapping slot is not met, it is not expected to transmit from the PUCCH resources in the overlapping slot.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and WDs 1210, 1210b, and 1210c. In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O & M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. . . . A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
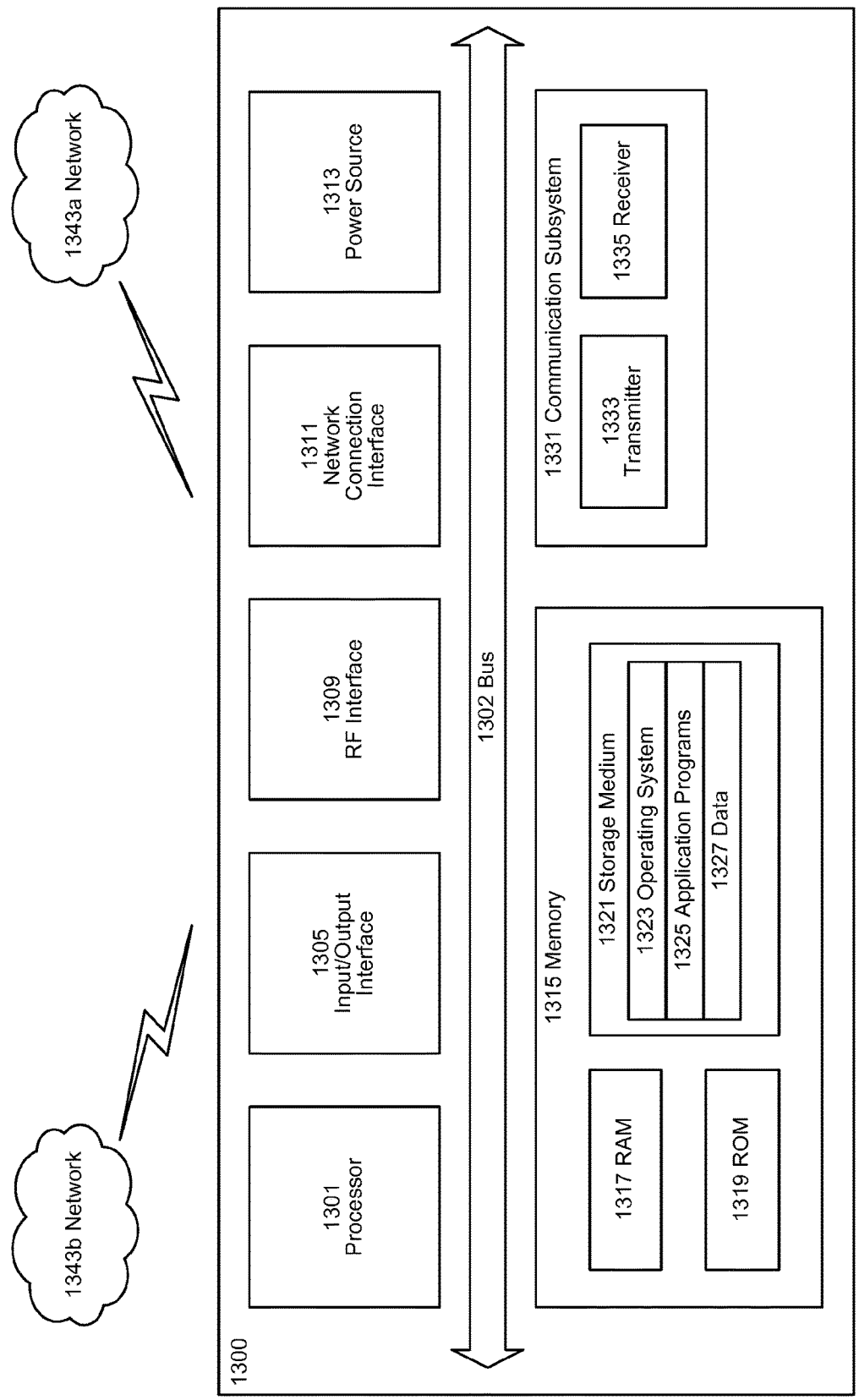
FIG. 13 is a block diagram of a user equipment according to some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the $3^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343*a*. Network 1343*a* may encompass wired and/or wireless networks such as a local-area network (LAN), a wide-area network (WAN), a computer network, a wireless network, a telecommunications network, another like network or any combination thereof. For example, network 1343*a* may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343b using communication subsystem 1331. Network 1343a and network 1343b may be the same network or networks or different network or networks. Communication subsystem 1331 may be configured to include one or more transceivers used to communicate with network 1343b. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343b may encompass wired and/or wireless networks such as a local-area network (LAN), a wide-area network (WAN), a computer network, a wireless network, a telecommunications network, another like network or any combination thereof. For example, network 1343b may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
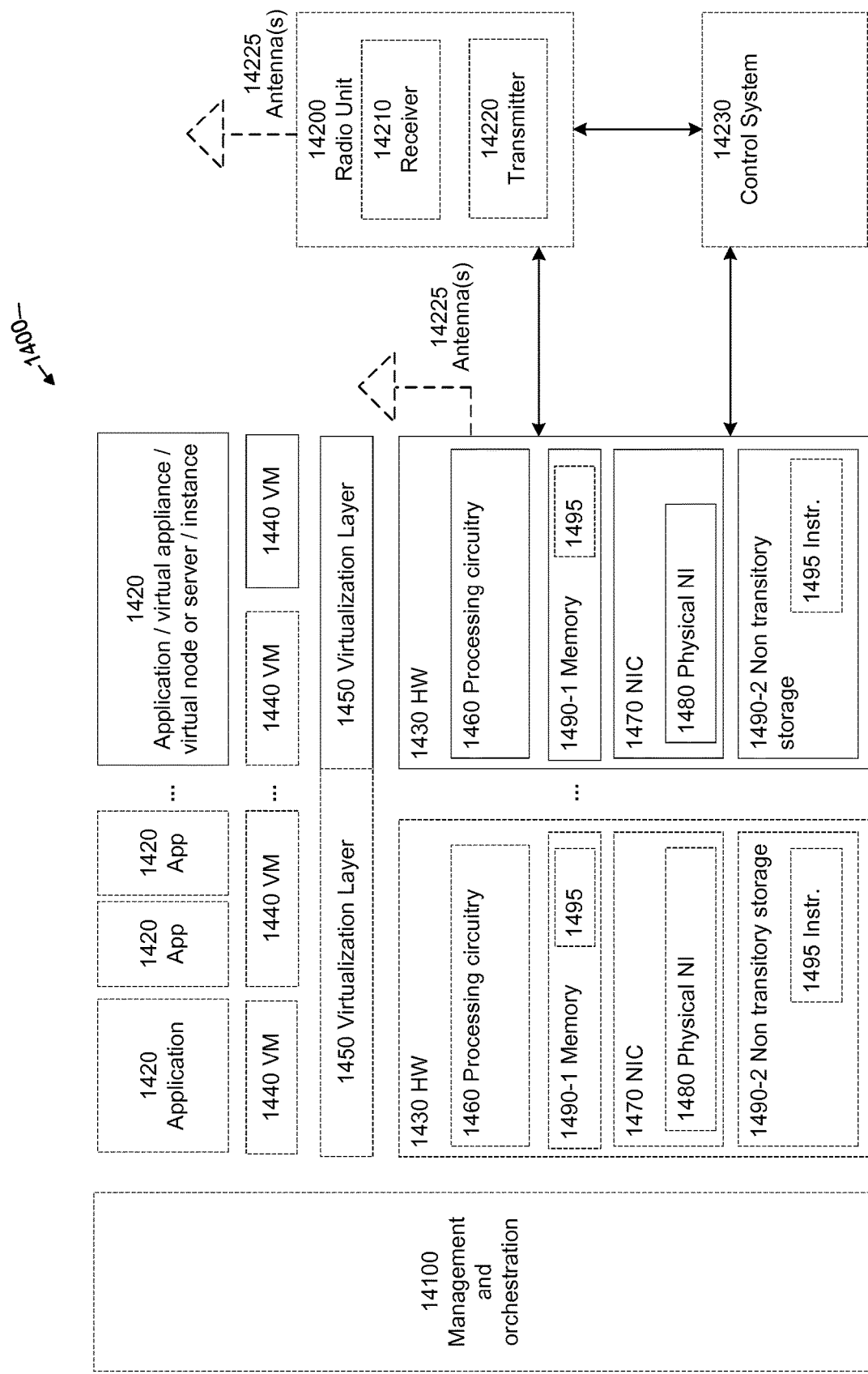
FIG. 14 is a block diagram of a virtualization environment according to some embodiments.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
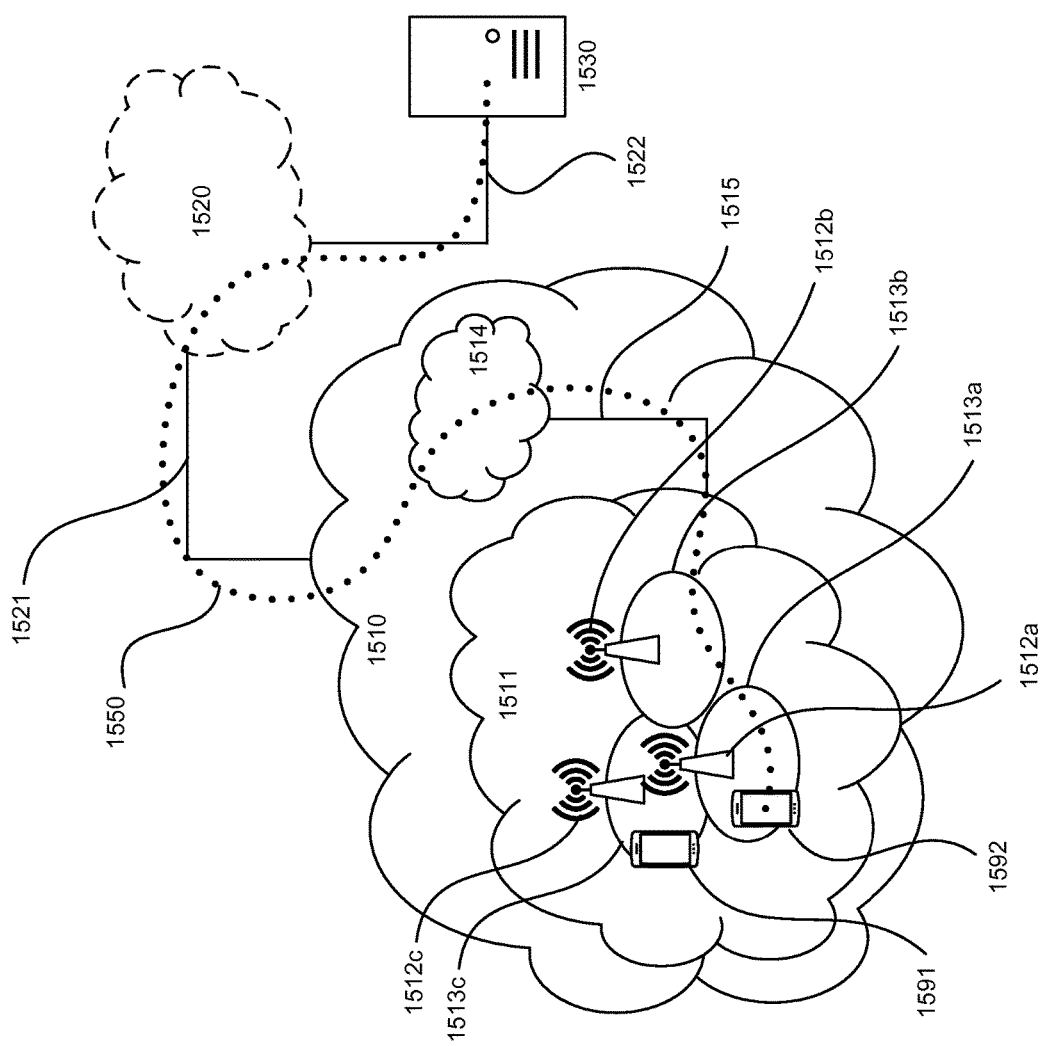
FIG. 15 is a block diagram of a communication network with a host computer according to some embodiments.

FIG. 15 illustrates a telecommunication network connected via an intermediate network to a host computer in accordance with some embodiments. In particular, with reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512*a*, 1512*b*, 1512*c*, such as NBs, eNBs, gNBs or other types of wireless access points, each defining a corresponding coverage area 1513*a*, 1513*b*, 1513*c*. Each base station 1512*a*, 1512*b*, 1512*c* is connectable to core network 1514 over a wired or wireless connection 1515. A first UE 1591 located in coverage area 1513*c* is configured to wirelessly connect to, or be paged by, the corresponding base station 1512*c*. A second UE 1592 in coverage area 1513*a* is wirelessly connectable to the corresponding base station 1512*a*. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
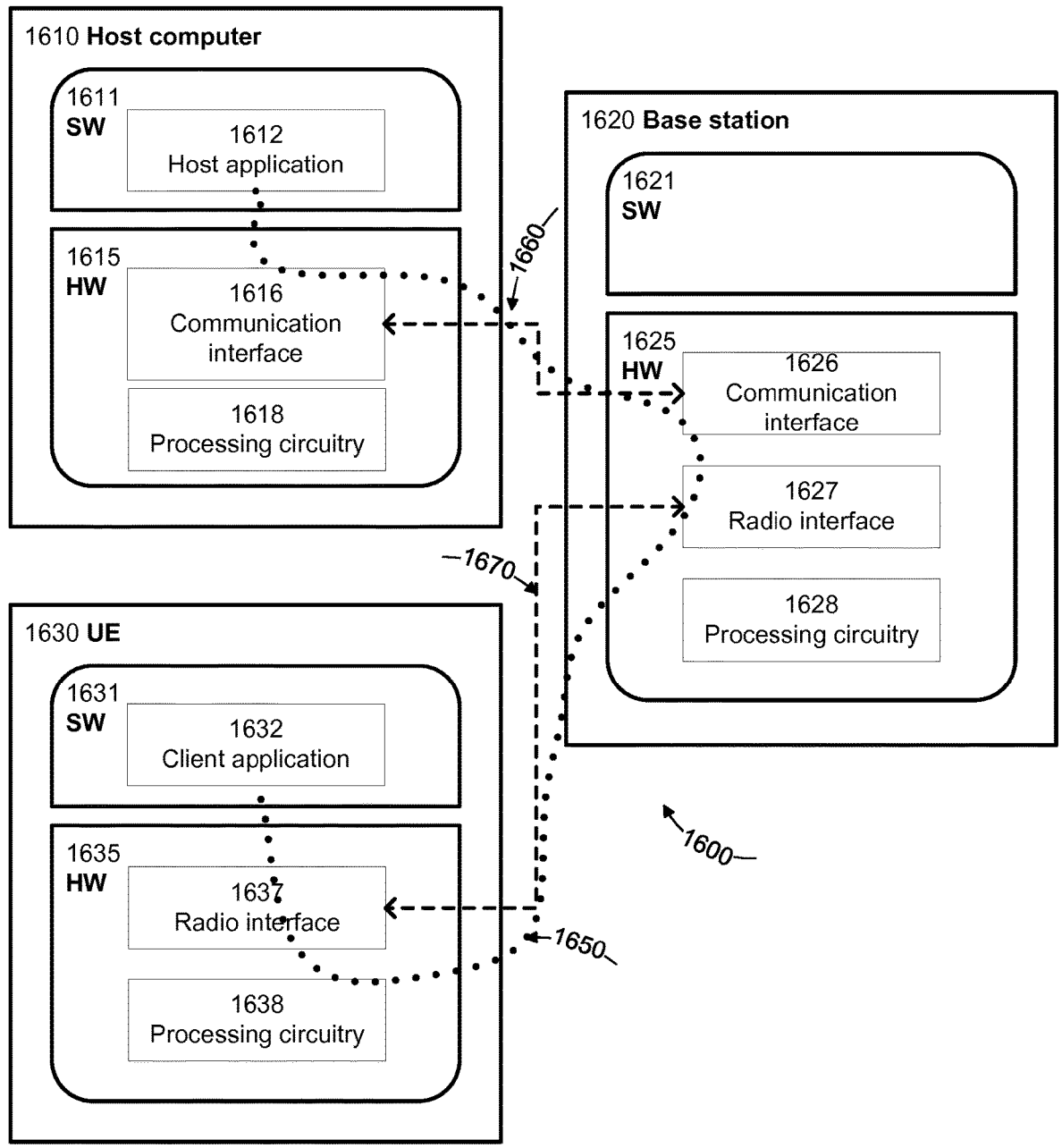
FIG. 16 is a block diagram of a host computer according to some embodiments.

Example implementations, in accordance with an embodiment, of the UE, base station and host computer discussed in the preceding paragraphs will now be described with reference to FIG. 16. FIG. 16 illustrates host computer communicating via a base station with a user equipment over a partially wireless connection in accordance with some embodiments In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512*a*, 1512*b*, 1512*c* and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the teachings of these embodiments may improve the system performance when control channel resources overlap. This may in turn reduce control signaling transmission attempts and/or increase control signaling throughput and thereby provide benefits such as reduced user waiting time, better responsiveness, and extended battery lifetime.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
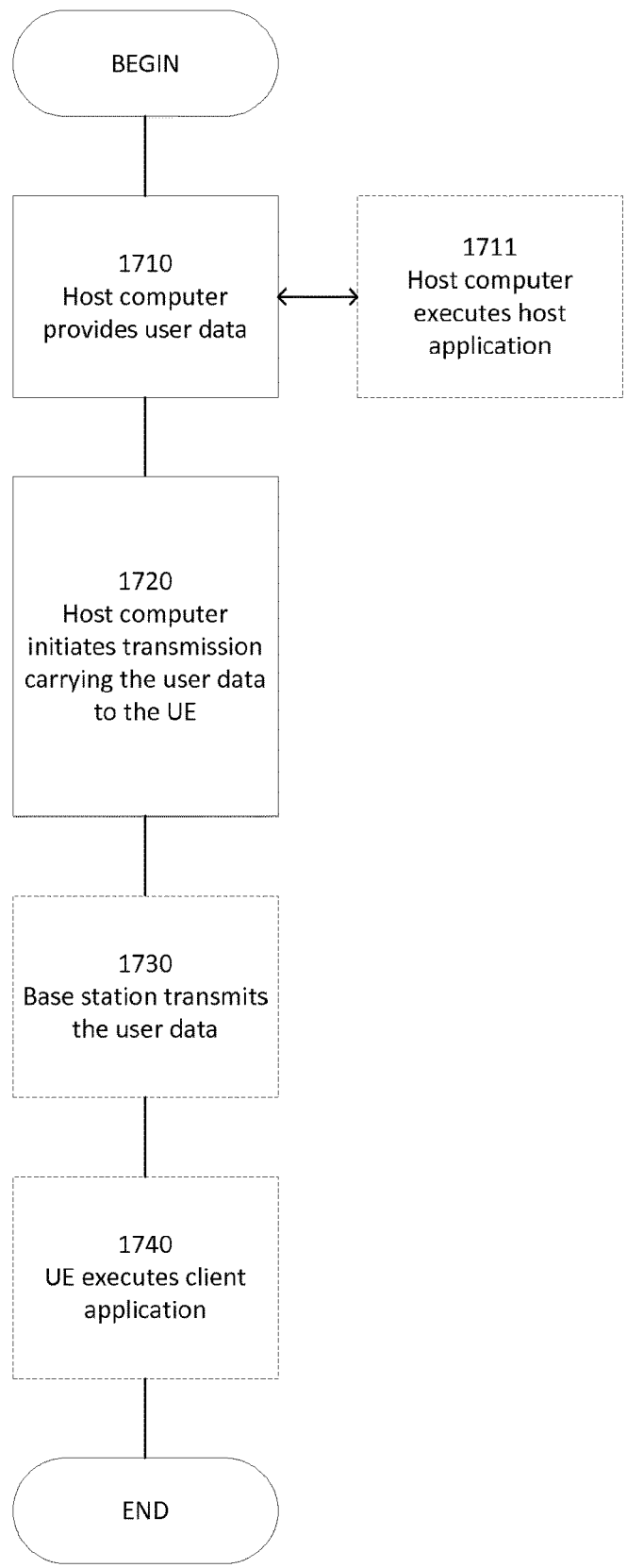
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
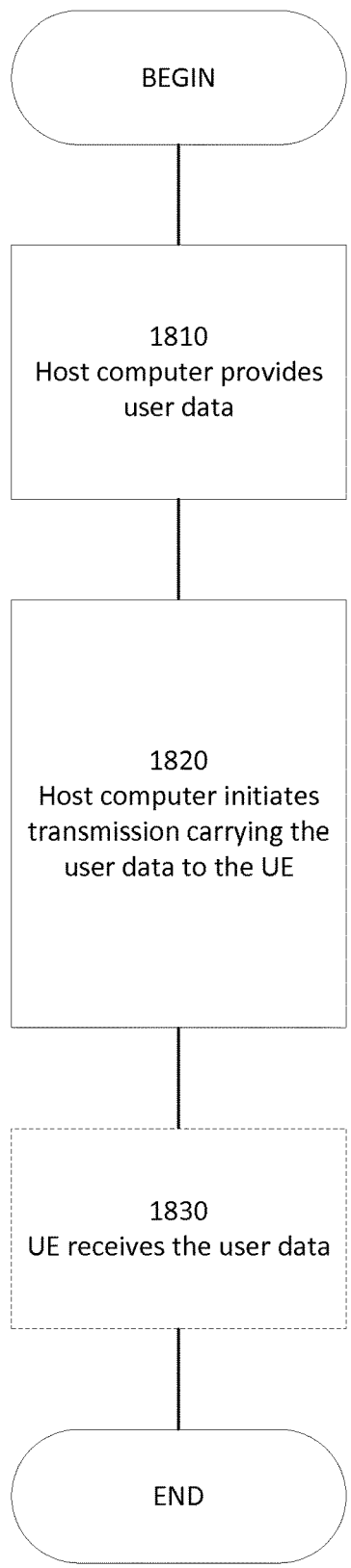
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
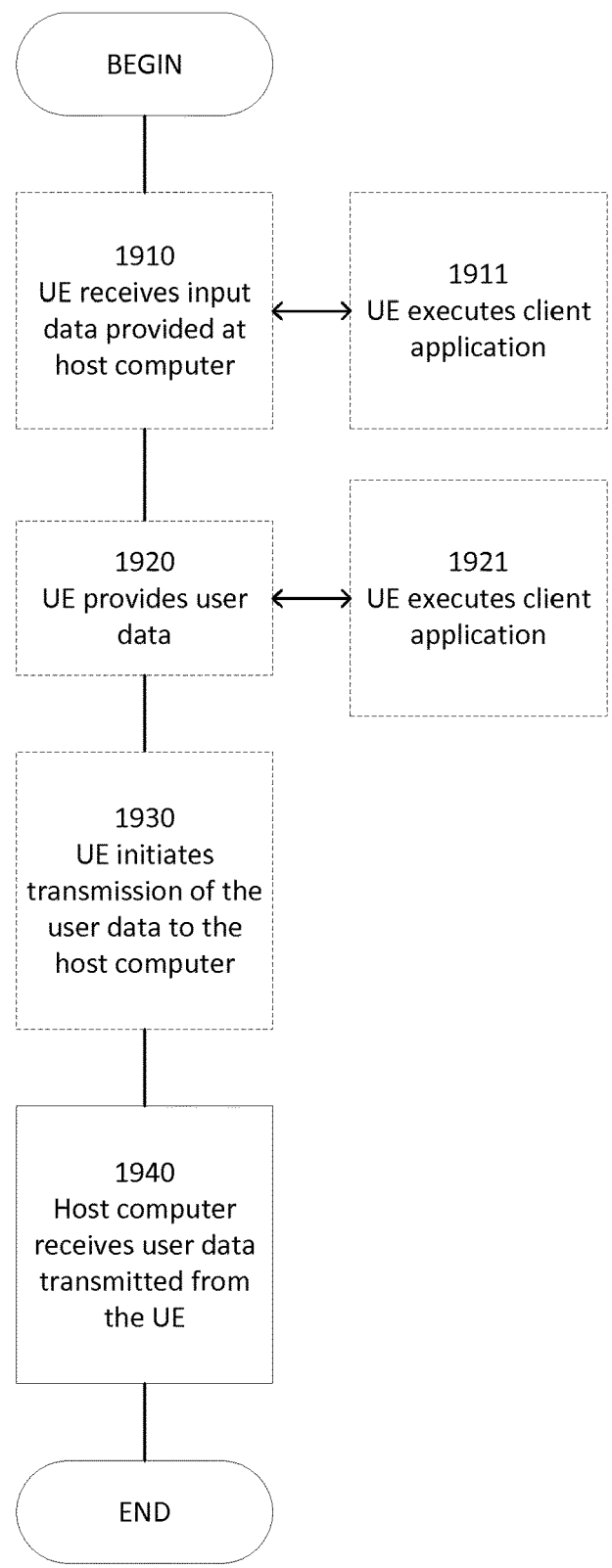
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
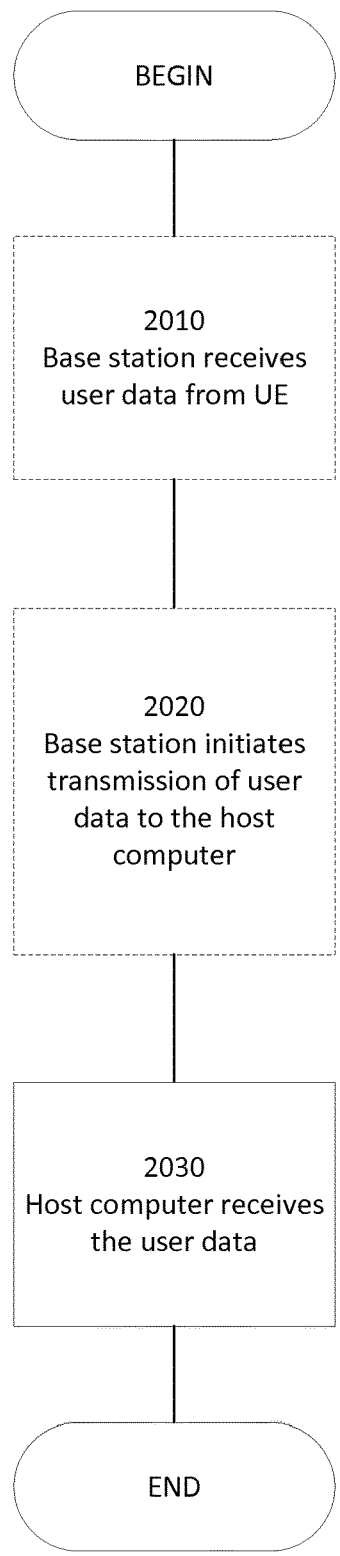
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method performed by a wireless device configured for use in a wireless communication system, the method comprising:
   determining that an uplink control channel resource for a multi-slot uplink control channel transmission overlaps in time with an uplink control channel resource for a single-slot uplink control channel transmission in a slot;
   deciding, for the slot to drop the single-slot uplink control channel transmission, in response to the two transmissions carrying uplink control information of the same priority; and
   dropping the single-slot uplink control channel transmission in the slot, according to said deciding.

2. The method of claim 1, wherein the uplink control channel resource for the multi-slot uplink control channel transmission comprises a physical uplink control channel (PUCCH) resource for a multi-slot PUCCH transmission, wherein the multi-slot uplink control channel transmission is the multi-slot PUCCH transmission, wherein the uplink control channel resource for the single-slot uplink control channel transmission comprises a PUCCH resource for a single-slot PUCCH transmission, and wherein the single-slot uplink control channel transmission is the single-slot PUCCH transmission.

3. The method of claim 1, wherein different types of uplink control information include hybrid automatic repeat request (HARQ) acknowledgement information, a scheduling request (SR) and channel state information (CSI) wherein HARQ acknowledgment information has a higher priority than an SR, and wherein an SR has a higher priority than CSI.

4. The method of claim 1, wherein the wireless communication system is a 5G system or a New Radio (NR) system.

5. The method of claim 1, further comprising:
determining that another uplink control channel resource for another multi-slot uplink control channel transmission overlaps in time with another uplink control channel resource for another single-slot uplink control channel transmission in another slot;
deciding, for the another slot, to drop whichever of the another multi-slot uplink control channel transmission and the another single-slot uplink control channel transmission carries uplink control information of a lower priority, in response to the another multi-slot uplink control channel transmission and the another single-slot uplink control channel transmission carrying uplink control information of different priorities, and
dropping the another single-slot uplink control channel transmission or the another multi-slot uplink control channel transmission in the another slot, according to said deciding.

6. A method performed by a base station configured for use in a wireless communication system, the method comprising:
determining that an uplink control channel resource for a multi-slot uplink control channel transmission overlaps in time with an uplink control channel resource for a single-slot uplink control channel transmission in a slot;
deciding, for the slot to receive the multi-slot uplink control channel transmission, in response to the two transmissions carrying uplink control information of the same priority; and
receiving the multi-slot uplink control channel transmission in the slot, according to said deciding.

7. The method of claim 6, wherein the uplink control channel resource for the multi-slot uplink control channel transmission comprises a physical uplink control channel (PUCCH) resource for a multi-slot PUCCH transmission, wherein the multi-slot uplink control channel transmission is the multi-slot PUCCH transmission, wherein the uplink control channel resource for the single-slot uplink control channel transmission comprises a PUCCH resource for a single-slot PUCCH transmission, and wherein the single-slot uplink control channel transmission is the single-slot PUCCH transmission.

8. The method of claim 6, wherein different types of uplink control information include hybrid automatic repeat request (HARQ) acknowledgement information, a scheduling request (SR) and channel state information (CSI) wherein HARQ acknowledgment information has a higher priority than an SR, and wherein an SR has a higher priority than CSI.

9. The method of claim 6, wherein the wireless communication system is a 5G system or a New Radio (NR) system.

10. The method of claim 6, further comprising:
determining that another uplink control channel resource for another multi-slot uplink control channel transmission overlaps in time with another uplink control channel resource for another single-slot uplink control channel transmission in another slot;
deciding, for the another slot, to receive whichever of the another multi-slot uplink control channel transmission and the another single-slot uplink control channel transmission carries uplink control information of a higher priority, in response to the two transmissions carrying uplink control information of different priorities; and
receiving the another single-slot uplink control channel transmission or the another multi-slot uplink control channel transmission in the another slot, according to said deciding.

11. A wireless device comprising:
communication circuitry; and
processing circuitry configured to:
determine that an uplink control channel resource for a multi-slot uplink control channel transmission overlaps in time with an uplink control channel resource for a single-slot uplink control channel transmission in a slot;
decide, for the slot to drop the single-slot uplink control channel transmission, in response to the two transmissions carrying uplink control information of the same priority; and
drop the single-slot uplink control channel transmission in the slot, according to said decision.

12. The wireless device of claim 11, wherein the uplink control channel resource for the multi-slot uplink control channel transmission comprises a physical uplink control channel (PUCCH) resource for a multi-slot PUCCH transmission, wherein the multi-slot uplink control channel transmission is the multi-slot PUCCH transmission, wherein the uplink control channel resource for the single-slot uplink control channel transmission comprises a PUCCH resource for a single-slot PUCCH transmission, and wherein the single-slot uplink control channel transmission is the single-slot PUCCH transmission.

13. The wireless device of claim 11, wherein different types of uplink control information include hybrid automatic repeat request (HARQ) acknowledgement information, a scheduling request (SR) and channel state information (CSI) wherein HARQ acknowledgment information has a higher priority than an SR, and wherein an SR has a higher priority than CSI.

14. The wireless device of claim 11, wherein the wireless communication system is a 5G system or a New Radio (NR) system.

15. The wireless device of claim 11, wherein the processing circuitry is configured to:
decide, for the slot, to drop whichever of the multi-slot uplink control channel transmission and the single-slot uplink control channel transmission carries uplink control information of a lower priority, in response to the two transmissions carrying uplink control information of different priorities, and drop the single-slot uplink control channel transmission or the multi-slot uplink control channel transmission in the slot, according to said decision.

16. A base station comprising:
communication circuitry; and
processing circuitry configured to:
determine that an uplink control channel resource for a multi-slot uplink control channel transmission overlaps in time with an uplink control channel resource for a single-slot uplink control channel transmission in a slot;

decide, for the slot to receive the multi-slot uplink control channel transmission, in response to the two transmissions carrying uplink control information of the same priority; and receive the multi-slot uplink control channel transmission in the slot, according to said decision.

17. The base station of claim 16, wherein the uplink control channel resource for the multi-slot uplink control channel transmission comprises a physical uplink control channel (PUCCH) resource for a multi-slot PUCCH transmission, wherein the multi-slot uplink control channel transmission is the multi-slot PUCCH transmission, wherein the uplink control channel resource for the single-slot uplink control channel transmission comprises a PUCCH resource for a single-slot PUCCH transmission, and wherein the single-slot uplink control channel transmission is the single-slot PUCCH transmission.

18. The base station of claim 16, wherein different types of uplink control information include hybrid automatic repeat request (HARQ) acknowledgement information, a scheduling request (SR) and channel state information (CSI) wherein HARQ acknowledgment information has a higher priority than an SR, and wherein an SR has a higher priority than CSI.

19. The base station of claim 16, wherein the wireless communication system is a 5G system or a New Radio (NR) system.

20. The base station of claim 16, wherein the processing circuitry is configured to:

decide, for the slot, to receive whichever of the multi-slot uplink control channel transmission and the single-slot uplink control channel transmission carries uplink control information of a higher priority, in response to the two transmissions carrying uplink control information of different priorities, and receive the single-slot uplink control channel transmission or the multi-slot uplink control channel transmission in the slot, according to said decision.

* * * * *